United States Patent [19]
Wells et al.

[11] Patent Number: 5,334,991
[45] Date of Patent: Aug. 2, 1994

[54] DUAL IMAGE HEAD-MOUNTED DISPLAY

[75] Inventors: Benjamin A. Wells, Newton; Frank D. Smith, Milton; Michael A. Feldstein, Sudbury; Greg Hutner, Westwood, all of Mass.

[73] Assignee: Reflection Technology, Waltham, Mass.

[21] Appl. No.: 883,977

[22] Filed: May 15, 1992

[51] Int. Cl.⁵ .............................................. G09G 3/02
[52] U.S. Cl. ......................................... 345/8; 345/7; 359/201; 359/630
[58] Field of Search ............... 359/201, 203, 204, 213, 359/214, 225, 226, 630; 340/705

[56] References Cited

U.S. PATENT DOCUMENTS

| | | | |
|---|---|---|---|
| 3,760,181 | 8/1973 | Daly et al. | 250/332 |
| 4,439,157 | 3/1984 | Breglia et al. | 434/40 |
| 4,457,580 | 7/1984 | Klose | 359/221 |
| 4,632,501 | 12/1986 | Glynn | 359/199 |
| 4,636,866 | 1/1987 | Hattori | 358/236 |
| 4,655,543 | 4/1987 | Montagu | 359/214 |
| 4,861,125 | 8/1989 | Vaught | 359/214 |
| 4,902,893 | 2/1990 | Burrer | 359/201 |
| 5,009,473 | 4/1991 | Hunter et al. | 359/214 |

OTHER PUBLICATIONS

Abiko & Nomura "High-Resolution Display Using Light-Emitting Diode Arrays" Oki Technical Review, pp. 46–50, Jan. 1986.
Upton & Gordon "Eyeglass Heads-Up Display" SID 81 Digest pp. 48–49, Jul. 1981.
Upton & Gordon "Eyeglass Heads-Up Display" Proceedings of the SID. vol. 23/2. pp. 77–80, 1982.
Reid "Micro-Display" IBM Technical Disclosure Bulletin vol. 22 No. 1 pp. 362–365, Jun. 1979.
Bull "Helmet Display Options-A Routemap" SPIE vol. 1290 pp. 81–92, 1990.

Primary Examiner—Alvin E. Oberley
Assistant Examiner—Minsun Oh
Attorney, Agent, or Firm—Cesari and McKenna

[57] ABSTRACT

A mechanical scanning dual-image display device utilizes two separate scanning mirror mechanisms with a common control that forces the scanning mirrors to move in opposition, and substantially cancel reaction forces. This cancellation is accomplished by providing each of the mirrors with an individual drive mechanism, commonly controlling the two drive mechanisms and arranging the geometry of each display so that the reaction forces acting on the overall display as a result of the mirror motion cancel. In a second embodiment, vibrations are reduced by driving both mirror assemblies from a common source. More specifically, both mirrors are oscillated by an eccentric and linkage mechanism driven by a common motor.

25 Claims, 17 Drawing Sheets

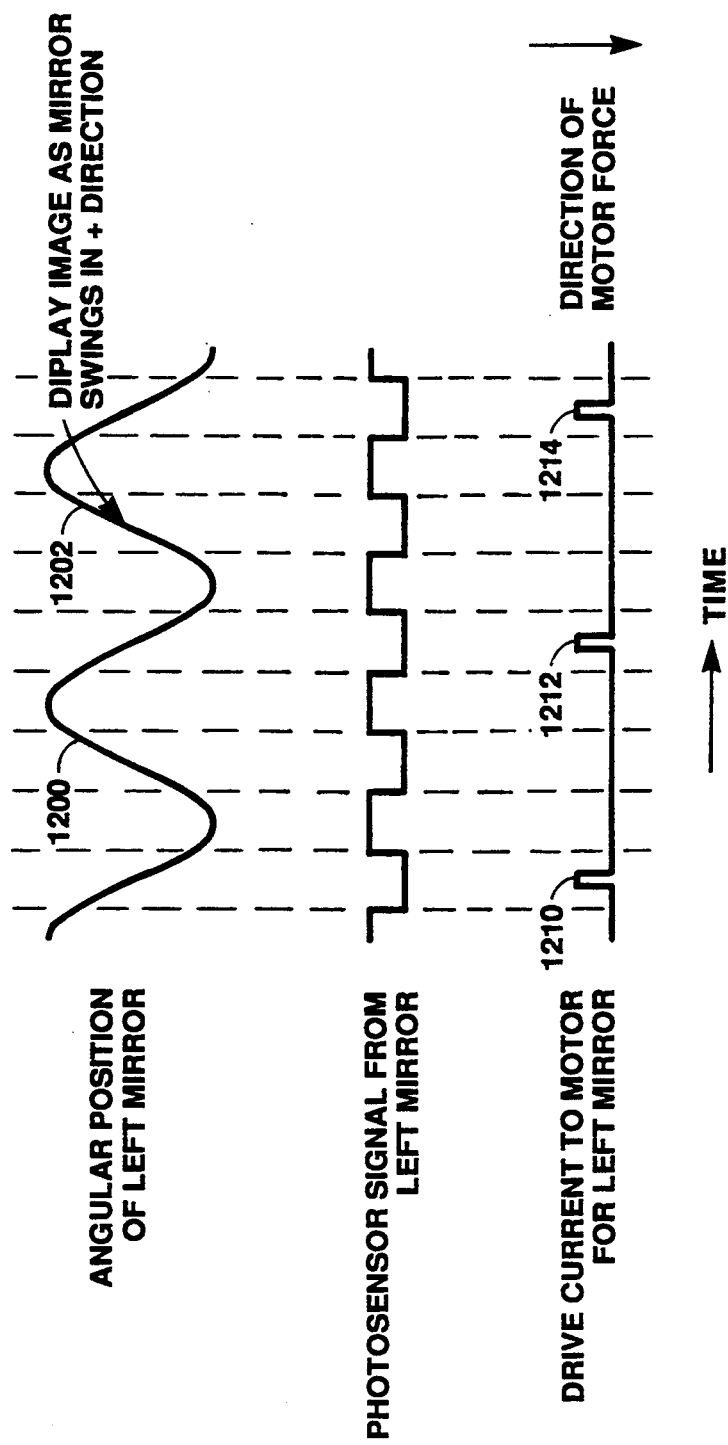

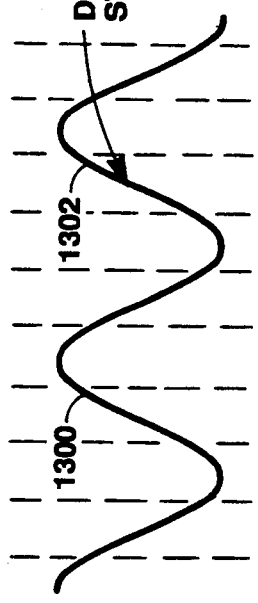
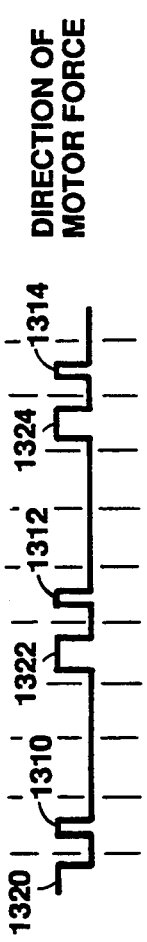
FIG. 13A
FIG. 13B
FIG. 13C

DUAL IMAGE HEAD-MOUNTED DISPLAY

FIELD OF THE INVENTION

This invention relates to head-mounted or helmet-mounted displays which simultaneously present an image to each eye of the viewer. More particularly, the invention relates to displays which use miniaturized scanning optics to create two raster-scan displays.

BACKGROUND OF THE INVENTION

There are many uses of for head-mounted visual display devices. In the past most of these uses have been military where a typical use is a helmet-mounted display. Many of these military devices display an image for only one eye and superimpose the display over a live background so that the user looks "through" the display. Other "dual image" devices simultaneously display two images, one for each eye. Such conventional military devices are mounted on the helmet which is commonly worn in military applications and allow the user to fly aircraft or operate equipment while receiving information from the display.

Recently, other applications for dual image displays have arisen. These newer applications include "virtual reality" displays in which the displays are not transparent—instead, the images generated by the displays are substituted for the live image. Such displays may be combined with head position sensors so that the images presented to the user change as the user moves his head. Virtual reality displays allow a computer which controls the displays to effectively control a user's visual environment.

Both conventional military displays and prior art virtual reality displays have used one of several types of prior art technologies. One type of "conventional" helmet-mounted dual-image display uses a pair of conventional cathode ray tubes (CRTs) to generate the two images. Generally, the CRTs are mounted on the user's helmet, and an optical system allows the wearer to see a magnified image of the CRT image by projecting the image onto the inside surface of the helmet visor. In order to attain reasonable resolution, it has been necessary to use miniaturized high-resolution CRT tubes which have been heretofore so expensive that their use has been limited to military applications. In addition, such displays are often bulky and heavy, causing neck fatigue, and place high voltages and powerful magnetic fields close to the user's head.

Other conventional head-mounted displays use liquid crystal displays (LCDs) passive matrix LCD panels or other flat panels. These latter displays are conceptually similar to the CRT based devices, but use one or two flat panel displays instead of CRTs to generate the visual images. These flat panel displays have an advantage over CRT displays in that they are generally light-weight and inexpensive making them suitable for uses such as consumer-oriented virtual reality displays. However, they suffer from additional drawbacks. In general, presently available flat panel displays generate poor quality images when compared to CRT displays. In addition, passive matrix LCD panels suffer from long image persistence, so that quickly-moving images are perceived as badly blurred.

Another conventional type of dual-image head-mounted display uses CRTs or LCD panels which are mounted near the user, but on a fixed platform, to generate the images and a coherent fiber-optic bundle to carry the image to the helmet for display. In addition to the drawbacks discussed above, the high cost of coherent fiber bundles has limited the use of this latter type of display especially in relatively low-cost consumer applications.

Another problem which has arisen in the use of the aforementioned conventional dual-image displays in virtual reality devices is that the user commonly perceives a clear demarcation between the dark background of the image area and the surrounding dark non-image area. It has been found that the experience of "virtual reality" is enhanced if this demarcation is not perceived or is minimized.

Another type of miniaturized display which is suitable for dual-image displays and especially for low-cost consumer virtual reality displays is a mechanical scanning display. This latter display uses a line of light-emitting devices to generate one line of an image. The line image is reflected from a mirror to a user's eye. By mechanically moving the mirror as the line image changes, a raster scan image can be generated. Suitable optics allow the display to be miniaturized to the point where it can be conveniently mounted on the user's head. This type of display is described in detail in U.S. Pat. Nos. 4,934,773 and 5,003,300 assigned to the assignee of the present invention. The disclosure of These latter patents is incorporated herein by reference.

These latter displays have high contrast and are thus particularly suited for virtual reality devices because the demarcation between the image and the background is minimized. However, since the displays utilize mechanically moving mirrors, mechanical vibration is a problem. In displays which generate only one image, the mechanical vibrations can be minimized by careful design of the mirror supports, the use of a counterbalance and symmetric drive motor. Such an approach is described in detail in U.S. Pat. No. 4,902,083 assigned to the assignee of the present invention. However, when two separate displays are used to generate two images, for example, in virtual reality systems, the vibration problems are increased because the two displays may interact to generate a low-frequency "beat" vibration which is particularly annoying to the user.

Accordingly, this invention provides a light-weight dual image display mechanism that can be worn like a pair of glasses and can be configured as both a transparent and an opaque display. The display is suitable for use as a virtual reality display because it has very high contrast, so that there is no clear demarcation between black background of image area and the surrounding background and the display image has a low persistence to allow head tracking without image smear. The scanning mechanism is designed to reduce vibration in dual image head-mounted applications so that a dual image display can be combined with a head motion tracking mechanism to cause the display to respond to head motion. The dual image display architecture is designed to efficiently share electronics between both displays. In addition, the mechanism can be designed to display images in full color.

SUMMARY OF THE INVENTION

The foregoing problems are solved by one illustrative embodiment of the invention in which a mechanical scanning dual-image display device utilizes two separate scanning mirror mechanisms with a common control that forces the scanning mirrors to move in opposition, and substantially cancel reaction forces. This cancellation is accomplished by providing each of the mirrors with an individual drive mechanism, commonly controlling the two drive mechanisms and arranging the geometry of each display so that the reaction forces acting on the overall display as a result of the mirror motion cancel.

More particularly, each mirror is driven so that its motion is sinusoidal, and substantially equal and opposite to the motion of the other mirror and the weight distribution of the moving mirror section is arranged so that the reaction force vectors from each mirror are collinear, equal in magnitude, and of opposite sign.

In a second embodiment, vibrations are reduced by driving both mirror assemblies from a common source. More specifically, both mirrors are oscillated by an eccentric and linkage mechanism driven by a common motor.

BRIEF DESCRIPTION OF THE DRAWING

FIG. 12A is a waveform diagram versus time of the angular position of the mirror assembly 1102 in FIG. 11.

FIG. 12B is a waveform diagram versus time of the signal developed by the photocell associated with the mirror assembly 1102 in FIG. 11.

FIG. 12C is a waveform diagram versus time of the drive current supplied to the mirror drive coil in the mirror assembly 1102 in FIG. 11.

FIG. 13A is a waveform diagram versus time of the angular position of the mirror assembly 1102 in FIG. 11.

FIG. 13B is a waveform diagram versus time of the signal developed by the photocell associated with the mirror assembly 1102 in FIG. 11.

FIG. 13C is a waveform diagram versus time of the drive current supplied to the mirror drive coil in the mirror assembly 1102 in FIG. 11 in order to compensate for unequal mirror assemblies.

DETAILED DESCRIPTION OF THE PREFERRED EMBODIMENTS

Figure 1:
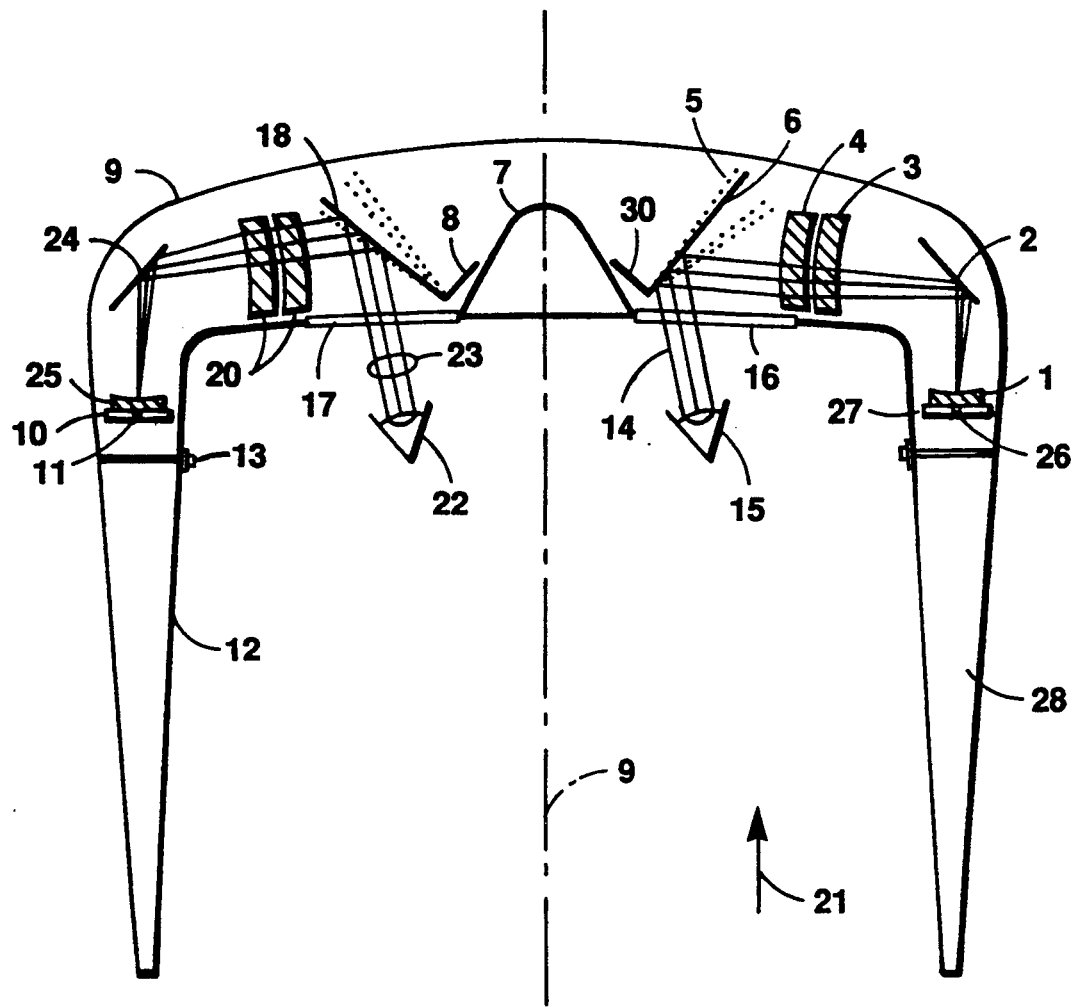
FIG. 1 is a top phantom view of an illustrative embodiment of the invention showing the basic arrangement of the major components of a dual image display device configured to fit into an "eyeglass" type frame.
Figure 2:
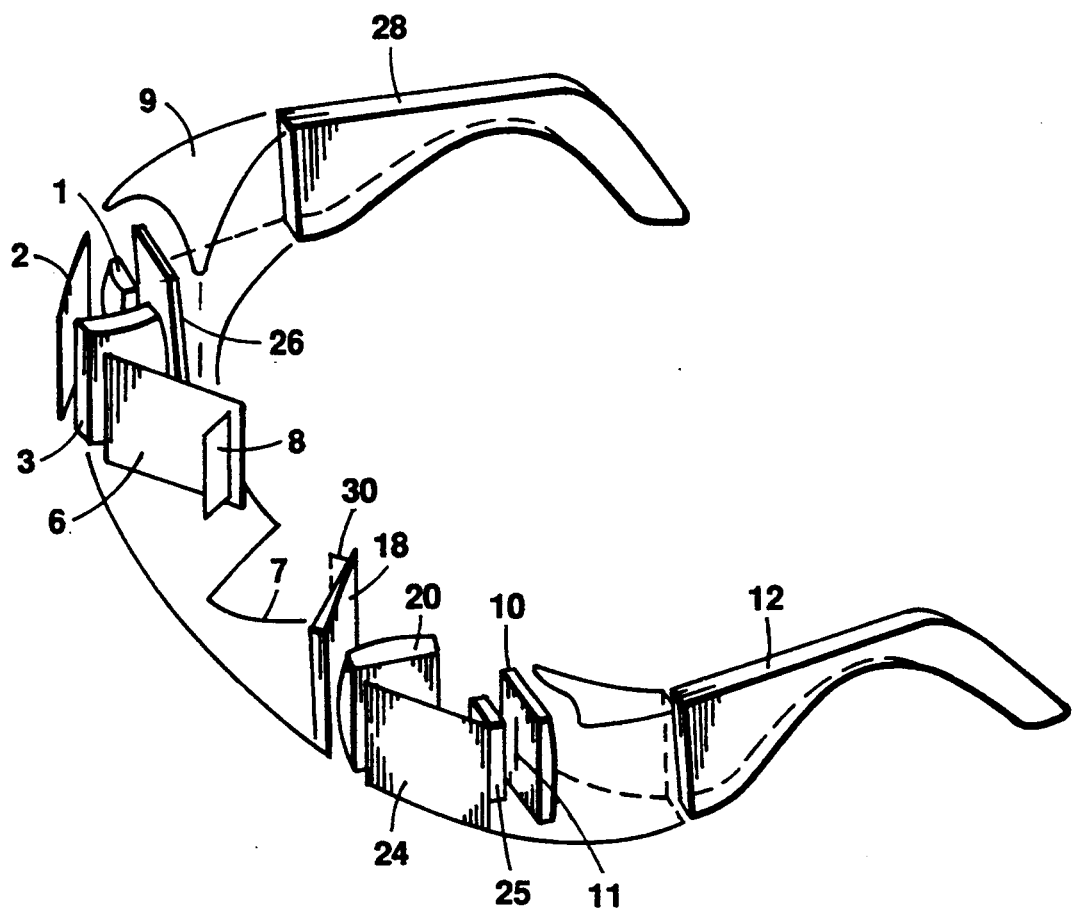
FIG. 2 is a partial isometric view of the inventive embodiment shown in FIG. 1 showing the relative locations of the major components.
Figure 3:
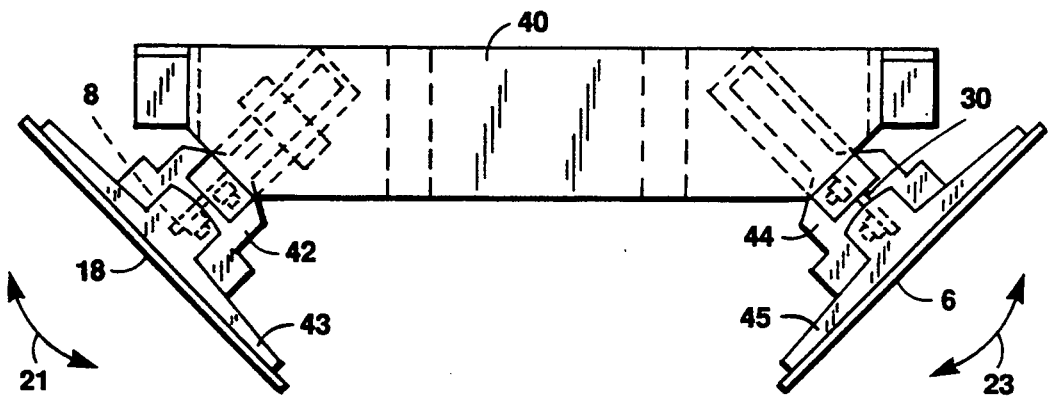
FIG. 3 is a top view of an illustrative dual mirror mount with independent drive coils.
Figure 4:
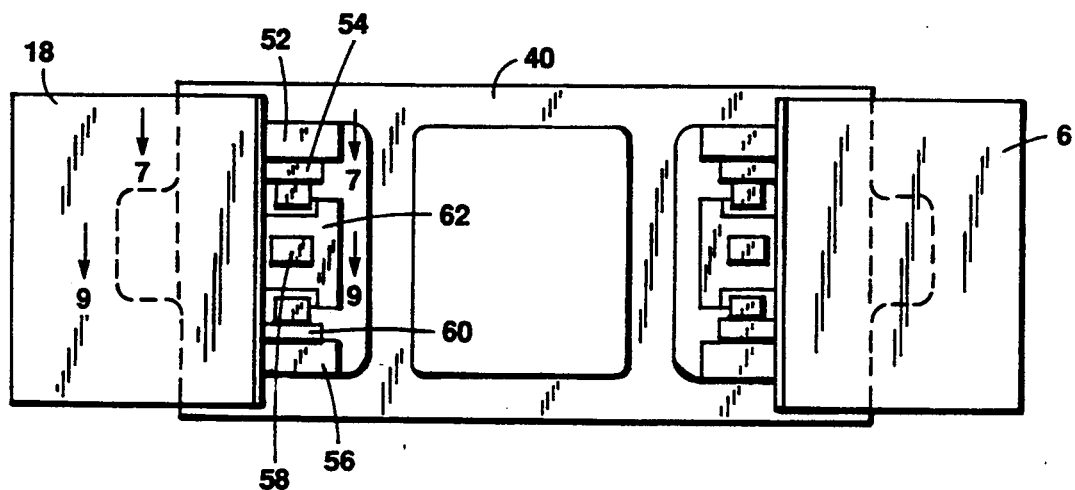
FIG. 4 is a front plan view of the dual mirror mount shown in FIG. 3.
Figure 5:
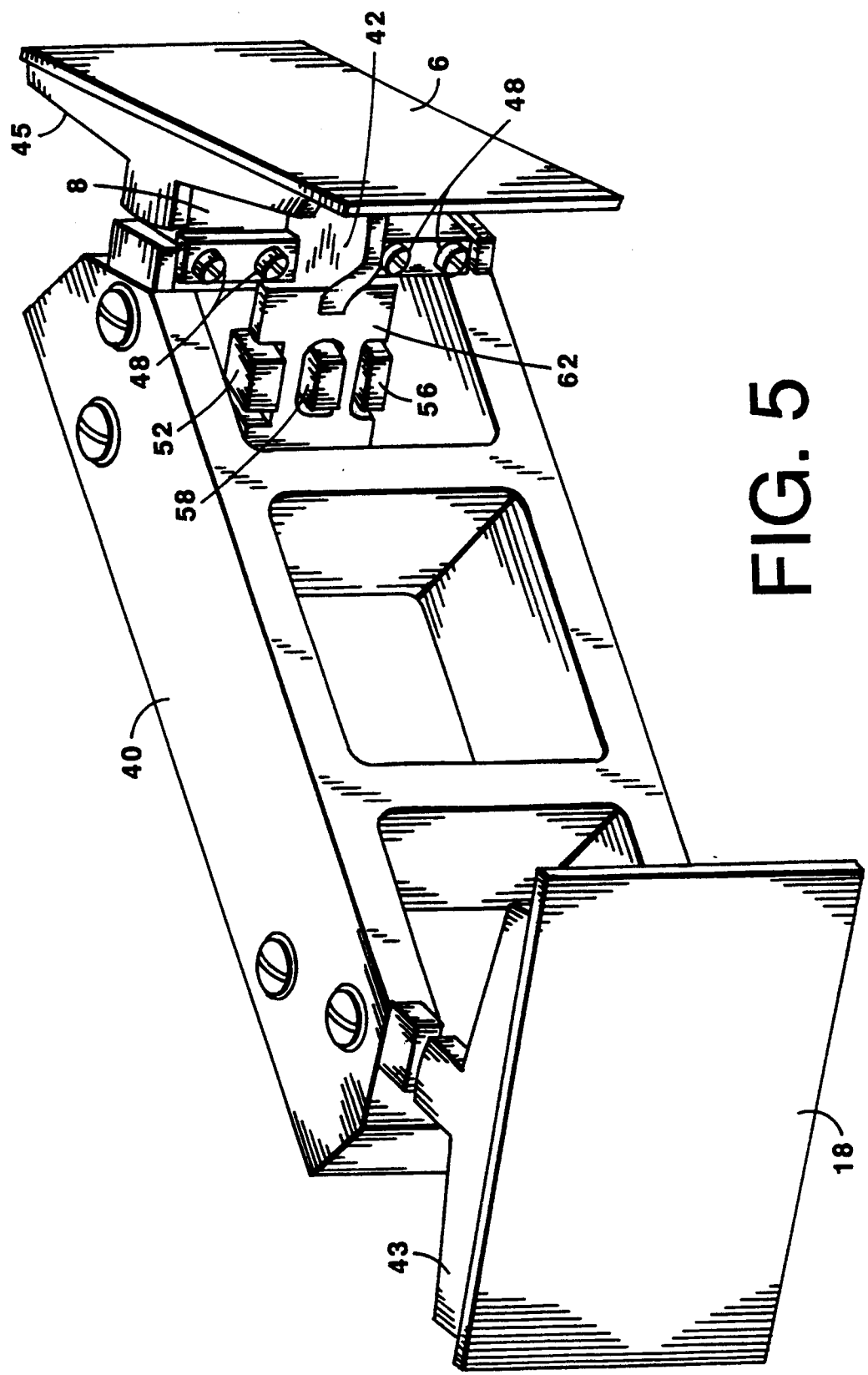
FIG. 5 is a front isometric view of the dual mirror mount shown in FIG. 3.

FIG. 1 shows a schematic phantom diagram of an illustrative dual image display unit using the aforementioned scanning mirror technology. This inventive embodiment is particularly useful for virtual reality devices in which an image is presented to each eye of the user because it is relatively lightweight and can be configured in a package similar to eyeglasses. FIG. 2 is a partial isometric view of the device which is shown in top view of FIG. 1 and FIGS. 1 and 2 are both partial views which illustrate the positions of the basic device elements.

More particularly, the device consists of a molded plastic case 9, which is shaped to surround a user's eyes. The molded plastic case is hollow and completely surrounds the optical components which generate the images in order to preclude ambient background light from interfering with the images. Two transparent viewing windows 16 and 17 are provided for viewing the images generated within the display device. Windows might be equipped with an eyeglass prescription as desired. A cutout 7 is provided in the case 9 to clear the user's nose. A curved portion of the housing (not shown) fits in front of the user's nose and extends the full width of the housing; the curved housing portion width decreases so that no clearance is required at the top of the case.

The mirrors might be partially reflective, with a transparent front section being provided in the case 9 to make the arrangement "see-thru". The mechanical arrangement is symmetrical and components of the device are located symmetrically on either side of the device center line 19. Two complete, independent image display mechanisms are used so that either the same, or different, images may be presented to the user's eyes.

Each display mechanism consists of a light emitting device array, an optical system and a vibrating mirror. Although, the light emitting devices can be configured in different patterns, preferably the light-emitting devices are arranged in a linear array. Two such linear device arrays 11 and 26 are schematically shown extending into and out of the plane of the paper in the illustrative embodiment. The light-emitting device arrays, 11 and 26, may illustratively be composed of a plurality of light-emitting diodes (LEDs) which can be mounted on ceramic substrates, 10 and 27, which also support conventional shift registers and drivers (not shown) used-to control and illuminate the LED devices. The shift registers and drivers are connected by leads (not shown) to a computer which controls the LED devices in synchronism with the motion of the mirrors as described in more detail in the aforementioned U.S. Pat. Nos. 4,934,773 and 5,003,300.

The light emitted by the light-emitting devices, 11 and 26 passes through negative lenses, 1 and 25, which act as field flatteners to correct for distortion in the lens system. In FIG. 1, negative lenses 1 and 25 are shown located directly on the surface of the substrates 10 and 26, however, it is also possible to locate the correction lenses 1 and 25 in front of the substrates 10 and 26. A mechanism (not shown) may be provided to adjust the position of the LED substrates 10 and 27 to change the apparent image distance to suit the preference of the user. Such a focus adjustment has been found helpful to minimize eyestrain.

Light-emitting device arrays 11 and 27 are positioned so that the light is projected in the direction of arrow 21. This light is then reflected from a pair of non-movable folding mirrors 2 and 24 so that it passes towards lenses 3, 4 and 20. Magnifying lenses 3, 4, and 20 are used to magnify the images generated by the LED arrays 11 and 27 so that they can be comfortably viewed by the user. The magnified images are then reflected from a pair of scanning mirrors 6 and 18. Lenses 3, 4 and 20 may be fabricated as glass lenses. A single lens design using an aspheric surface contour can also be used and fabricated in a plastic material.

Mirrors 6 and 18 may be hinged at a variety of points so that they move as shown by dotted lines 5. In the illustrative embodiment shown in FIGS. 1 and 2, the mirror pivot points 8 and 30 are shown at one end of the mirror. The location at the end of the mirror is desirable if the mirrors are semi-transparent for use as a see-thru display, however, the mirror pivot points could also be located at other points as will hereinafter be discussed in detail. As discussed in detail in the aforementioned U.S. Pat. Nos. 4,934,773 and 5,003,300, the oscillatory motion of the mirrors 6 and 18 causes the line image generated by the linear LED arrays 11 and 27 to change position over time so that the user perceives a rectangular raster-scan image. If the LEDs are suitably controlled so that they are illuminated at appropriate times during the motion of the mirrors, a complete two-dimensional image of either alphanumeric text or graphics can be generated for each of the user's eyes.

These images, represented by rays 14 and 23, passes through transparent windows 16 and 17 to the user's eyes schematically illustrated at 15 and 22. Transparent windows 16 and 17 also serve to keep dust and contamination from reaching the display mechanism. In some cases, for example, if light-emitting devices 11 and 26 emit red light, windows 16 and 17 may comprise red filters to minimize interference of the images by reflection of ambient light.

The dual image display device can also be fitted with side pieces 12 and 28 which hook over the user's ears and are hinged to the mechanism by hinges such as hinge 13. With this configuration, the entire device can be folded up into a compact space in a manner similar to conventional eyeglasses.

FIGS. 1 and 2 illustrate the positions of scanning mirrors 6 and 18, but for clarity, these latter figures do not show any mechanism for mounting and driving the mirrors. FIGS. 3–9 show detailed views of one embodiment of a dual mirror mount which supports and drives mirrors 6 and 18 shown in FIGS. 1 and 2. The dual mirror mounts consists of a base or frame 40 which is affixed to case 9, shown in FIG. 1 by means of glue or screws (not shown). Base 40 may be made of metal, but is preferably molded from plastic material. Mirrors 6 and 18 are actually attached to two mirror supports 45 and 43 respectively which are, in turn, connected to frame 40 by means of flat spring hinges 8 and 30. Hinges 8 and 30 allow mirrors 18 and 6 to oscillate in the directions of arrows 21 and 23, respectively. Mirror supports 43 and 45 also have extensions 42 and 44 extending perpendicular to the plane of supports 43 and 45 which extensions support drive coils which are part of the mechanisms for moving the mirrors as will hereinafter be described.

Figure 7:
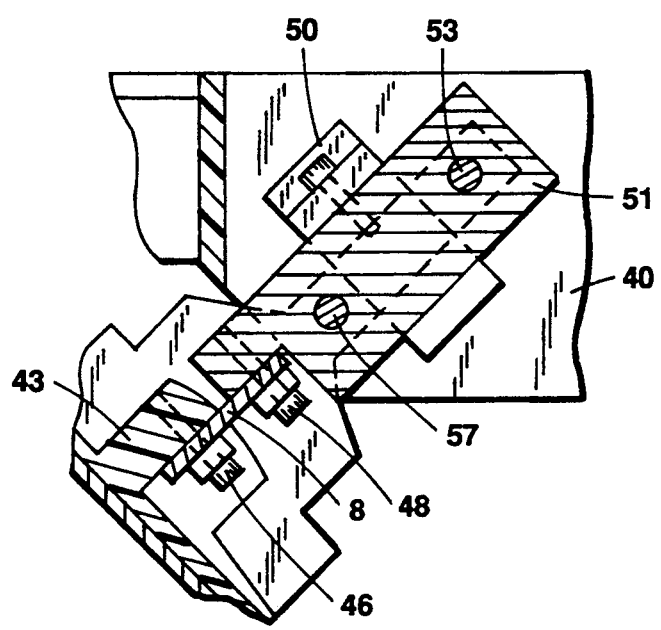
FIG. 7 is a sectional view of the mirror mount and drive coil assembly showing the spring hinges taken along the sectional line 7—7 in FIG. 4.
Figure 8:
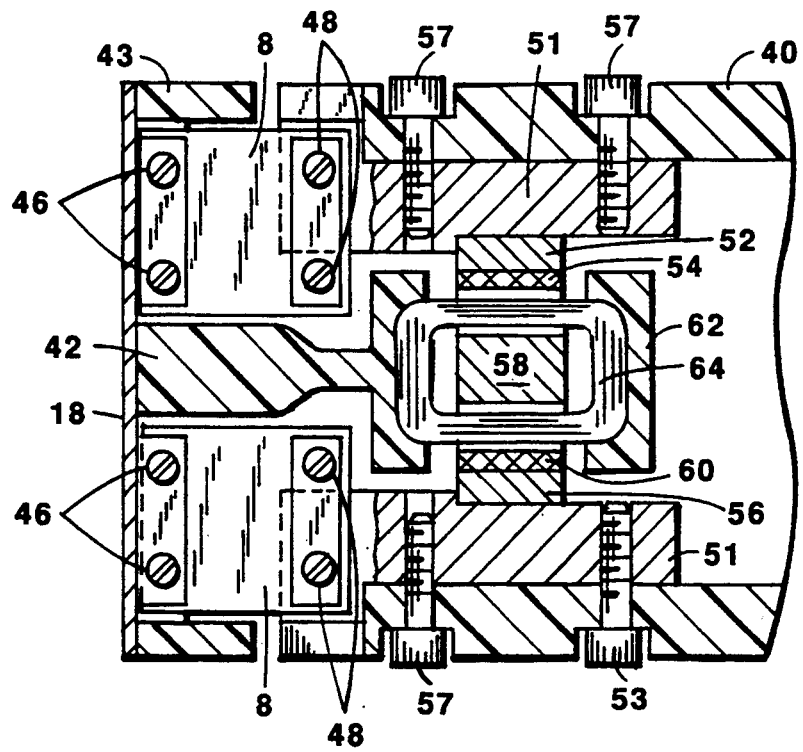
FIG. 8 is a sectional view of the mirror mount and drive coil assembly showing the spring hinges taken along the sectional line 8—8 in FIG. 6.
Figure 9:
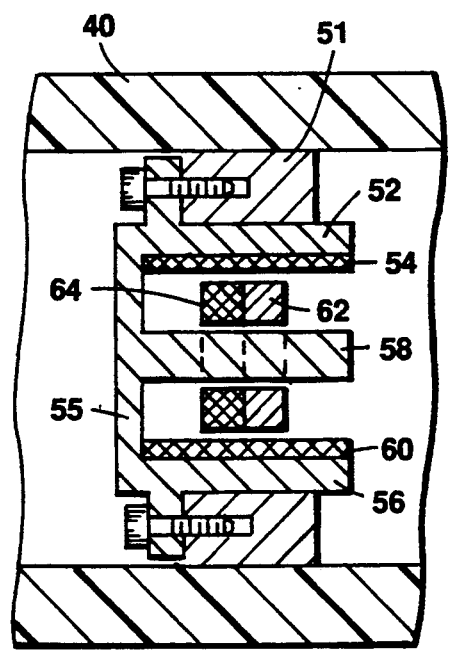
FIG. 9 is a sectional view of a "E" magnet frame taken along the sectional line 9—9 in FIG. 4.

Since the mirror assembly is symmetrical, only one half will be described in detail. More particularly, as shown in FIGS. 7 and 8, mirror support 43 is attached to a mirror mount assembly 51 by means of flat springs 8. Springs 8 are, in turn, attached to mirror support 43 and mount assembly 51 by means of screws 46 and 48. This latter attachment allows the mirror support 43 to pivot about a single line. Preferably two flat springs 8 are used as shown in FIG. 8, however, a single spring may also be used to support the mirror mount assembly. The mount assembly 51 is also attached to the frame 40 by means of screws 53 and 57.

Mirror 18 and support 43 are driven by a "voice coil" assembly which comprises a current carrying coil moving in a magnetic field. More particularly, extension 42 which is rigidly attached to mirror mount 43 has a coil support 62 molded onto its inboard end. Attached to coil support 62 is a voice coil 64, which consists of many turns of fine wire. Coil 64 is connected, by leads 70 and 72, (shown in FIG. 6) to terminals which allow current to be passed through the coil. The connection wires and terminals are conventional and are not described in detail. Due to the rigid connection between the coil support 62 and the mirror support 43, as the coil 64 moves, mirror 18 moves with it.

Coil 64 is positioned in slots in a magnet frame 55 which is attached to mount assembly 51. The particular type of magnet frame shown in FIGS. 3 through 9 is a "E-shaped" frame in that it has three arms, 52, 56 and 58 which extend on either side of, and through the center of, coil 64. Arms 52 and 56 have small permanent magnets 54 and 60 mounted thereon by means of glue or other adhesive. The magnet frame 55 is constructed of magnetically permeable material so that magnets 52 and 56 generate a magnetic field in the slots through which the legs of coil 64 move. By utilizing magnets of suitable polarity, a magnetic field can be generated which interacts with the current passing and the windings of coil 64 to generate a force in a well known manner, which force, in turn, moves coil support 62 and mirror 18.

Figure 6:
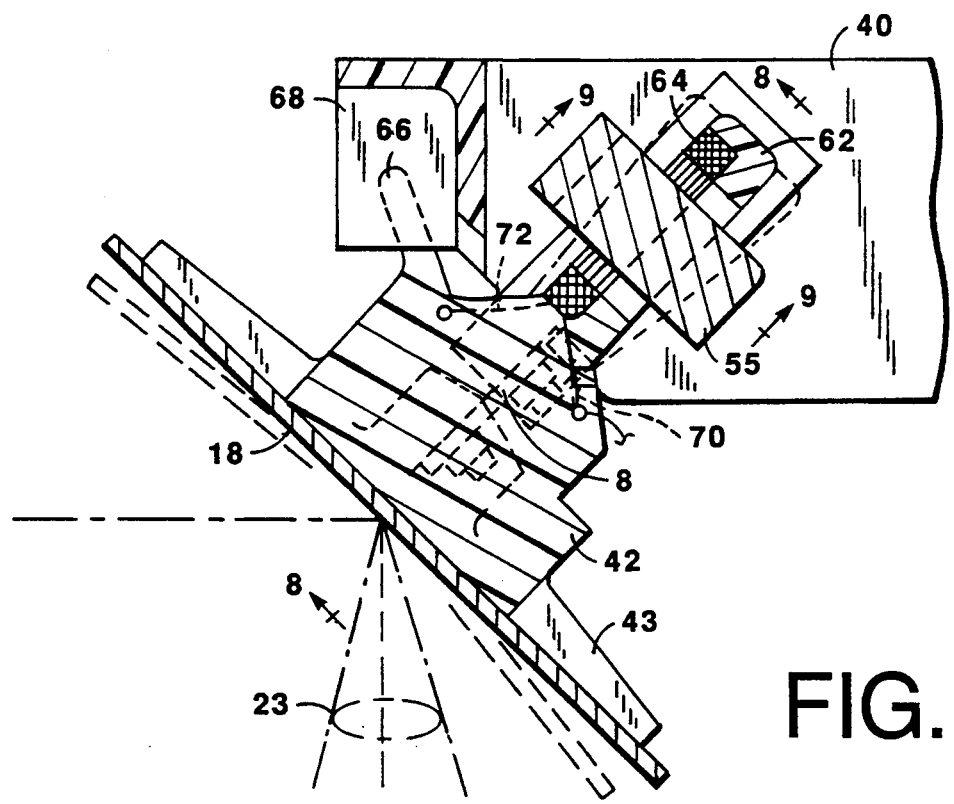
FIG. 6 is an expanded view of the mirror mount and drive coil of one mirror assembly with the mirror base cut away.

Also attached to the extension 42 is an opaque planar flag 66 which is shown best in FIG. 6. This flag is located between a photosensor 68 and an opposing LED (not shown). As the mirror moves the flag passes between the photosensor and LED at one end of the mirror travel. As the flag passes between the photosensor/LED, light emitted by the LED is blocked by the flag from reaching the photosensor. The signal generated by the LED is used to determine amplitude and timing of the mirror movement, as will hereinafter be described.

Figure 10:
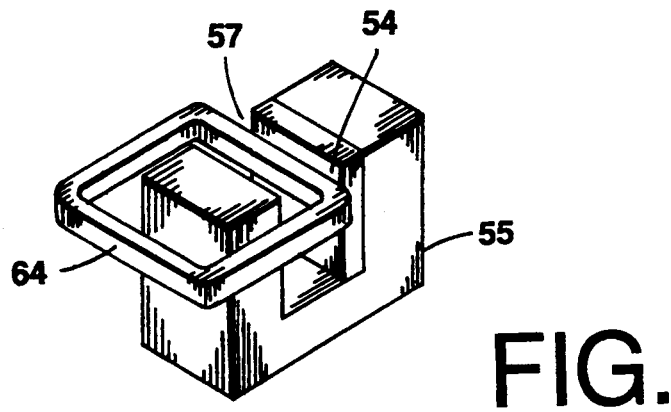
FIG. 10 is a partial isometric view of a "C" magnet frame suitable for use with the invention.

FIG. 10 is a simplified isometric view of another illustrative arrangement of the drive mechanism for one mirror which could be used in place of the arrangement shown in FIGS. 3-9. The arrangement also is a "voice-coil" driver consisting of a magnet frame, a magnet and a coil. The magnet frame 55 is constructed from a magnetically-permeable material such as steel and has a "C" shape. Either one or two magnets can be mounted on the frame (a single magnet 54 is shown in FIG. 10). Magnet 54 is bonded to the frame by glue or other conventional means and generates a magnetic field across the gap 57. A voice coil 64 fits into the gap 57 and moves in a manner previously described with respect to FIGS. 3-9.

In FIGS. 3-9, the voice coil 64 is shown attached to the moving mirror assembly 43, 44, and the magnet frame 55 is attached to the base 40. However, the magnet frame 55 could also be attached to the moving mirror assembly 43, 44 and the voice coil 64 attached to the base 40, since the relative force between the magnet frame and voice coil is the important consideration. Attachment of the magnet frame to the mirror assembly avoids the need for flexible lead wires to the magnet frame.

Since the mirror and driver structure shown in FIGS. 3-10 comprises two independent mirror assemblies, it suffers from the vibration problems previously discussed. In the structure shown in FIGS. 3-10, one way to reduce the vibration which is transferred to the user's head is to configure the geometry of the device so that the mirrors generate equal forces as they move and to drive the mirrors so that they move in opposing directions. In this manner, the reaction forces transmitted to the device base (and from there to the user's head) can be arranged to cancel.

Figure 11:
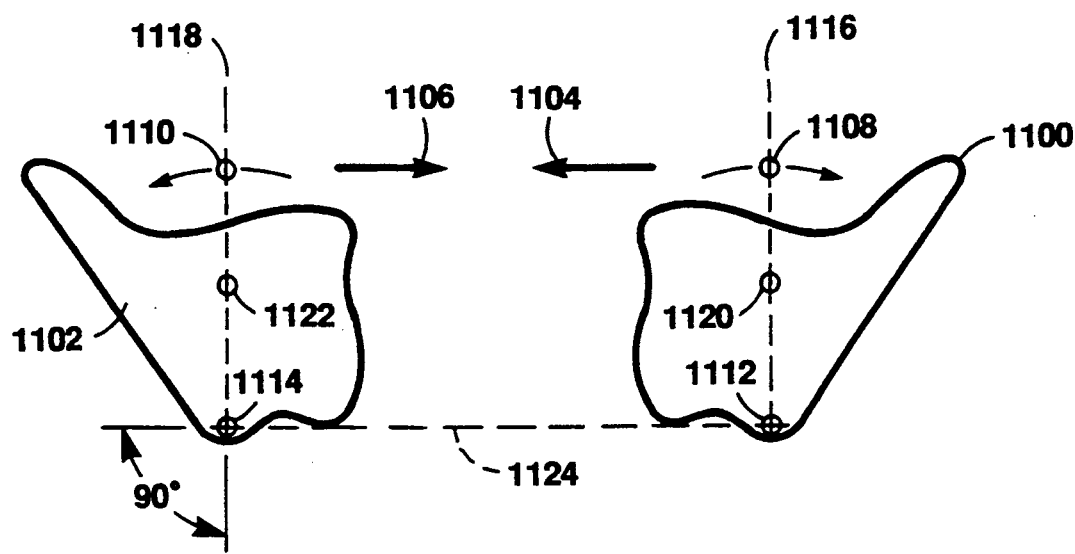
FIG. 11 is a conceptual diagram illustrating the various points involved in a force calculation on each mirror system.

In order to insure that the reaction forces are equal and opposite, each mirror must be driven by a force which can be adjusted independently from the force used to drive the other mirror, so that the mirror oscillation amplitude can be controlled. FIG. 11 shows a generalized diagram of the two-mirror system for purposes of discussion of the reaction forces. The following discussion assumes that both mirrors constructions are essentially of equal size and weight, have essentially equal rotary inertia and travel over equal angular arcs. Later in the discussion account will be made for the fact that in reality these assumptions are not totally accurate.

In FIG. 11, irregular shapes 1100 and 1102 are an abstract representation of the moving mirror assemblies, including the mirrors, mirror supports, support extensions, coil supports and coils. Mirror assembly 1100 is designed to mechanically pivot around pivot point 1112 and assembly 1102 pivots around point 1114. As will hereinafter be explained, drive forces are applied to each mirror so that motion of the two mirrors is sinusoidal, and substantially equal and opposite. For example as mirror assembly 1100 moves in the direction of arrow 1104, mirror assembly 1102 moves in the direction of arrow 1106. Under the influence of the applied force, the mirrors continuously scan through a limited angle and the angular arc swept out by each mirror is equal to the angular arc swept out by the other mirror.

The dual mirror mount can be designed to achieve substantial cancellation of reaction forces at the base by first using conventional mechanical design theory to lay out the geometry of the device to approximately cause such cancellation. In particular, in accordance with conventional mechanical design theory, the reaction forces on a rotating mass can be represented by a pair of force vectors (a primary force vector and a secondary force vector) which act on a conceptual "point of percussion". This "point" is shown in FIG. 11 as point of percussion 1108 for assembly 1100 and point 1110 for assembly 1102. Although the actual moving part will have both mass M and rotary moment of inertia, J, these two latter attributes may be modeled as an equivalent point mass located at the point of percussion.

The secondary force vector for assembly 1100 passes through the point of percussion 1108 and the pivot point 1112, and represents centrifugal force. The primary force vector 1104 passes through the point of percussion 1108 perpendicular to the secondary force vector, and represents the force needed to translate and rotate the mass about the pivot point 1112. Likewise, the secondary force vector for assembly 1102 passes through the point of percussion 1110 and the pivot point 1114, and the primary force vector 1106 passes through the point of percussion 1110 perpendicular to the secondary force vector.

In accordance with conventional mechanical design theory, the point of percussion is located on a line connecting the pivot point with the center of mass. For example, point of percussion 1108 for mirror assembly 1100 is located on line 1116 connecting pivot point 1112 and center of mass 1120. If mirror assembly 1100 has mass M, rotary inertia (about the center of mass 1120) J, and the distance from the center of mass 1120 to the pivot point 1112 is Rcg, then the distance from the pivot point 1112 to the point of percussion 1108, Rpp, is given by: $Rpp = [Rcg + J/(M*Rcg)]$. The actual mass M and rotary inertia J of the mirror assembly 1100 can be modeled as an equivalent point mass Meq located at the point of percussion whose magnitude is given by $Meq = M(1/(1 + J/(M*Rcg^2)))$.

If the mirror assembly is driven at its mechanical resonance frequency, the primary force vector has a relatively large sinusoidal magnitude which causes the mirror assembly to accelerate back and forth (the magnitude of the force is greatest at the extreme ends of travel of the mirror). This force depends only on the equivalent mass, Meq, of the mirror assembly and the amplitude of the mirror assembly travel.

With proper distribution of mass in the mirror assemblies 1100 and 1102, and with proper pivot point location, the primary reaction forces generated by the mirror assembly motion can be made to substantially cancel. In accordance with conventional theory, the criteria of force cancellation are:

a) the primary force vectors for each of the mirror assemblies are collinear, and b) the motion of the mirror assemblies is controlled such that the primary force vectors are equal and opposite magnitude.

If the mechanical system has a symmetrical construction (i.e., symmetrical geometry, equal masses, equal rotary inertia, etc.) then the above criteria can be re-stated as:

c) the center of mass for each mirror assembly (center of mass 1120 for mirror assembly 1100 and center of mass 1122 for mirror assembly 1102) must be located on line perpendicular to line connecting pivot points (line 1124) or lines 1116 and 1118 must be perpendicular to line 1124.

d) the mirror assemblies must be driven so that they have equal and opposite motion.

If the criteria described above are met for each mirror assembly, the result will be that the primary force vectors will sum to essentially zero for small angles of mirror assembly motion.

The secondary force vectors, corresponding to the centrifugal forces generated by rotation of the mirror assemblies about the pivot point are smaller than the primary force vectors, but cause residual forces on the mirror assemblies. These residual forces can be eliminated or reduced by several means. For example, if the mirror assemblies are designed so that each mirror assembly center of mass and pivot point coincide, the secondary force vectors are eliminated entirely. This type of design is very desirable and is illustrated in the design of FIGS. 3-9. However, this may not always be possible. For example, if the mirror assembly pivot is located near the end of the mirror as is shown in FIGS. 1 and 2, then the motor mass would need to be located outside the case 9 in order to put the center of gravity over the pivot.

Other alternatives include suspending the mirror assembly on a compliant mount, so that the slight motion caused by the unbalanced primary or secondary force is absorbed by the mount. Another technique is a conventional passive resonant damper attached to the base assembly and tuned to twice the mirror frequency.

Figures 12D, 12E, 12F:
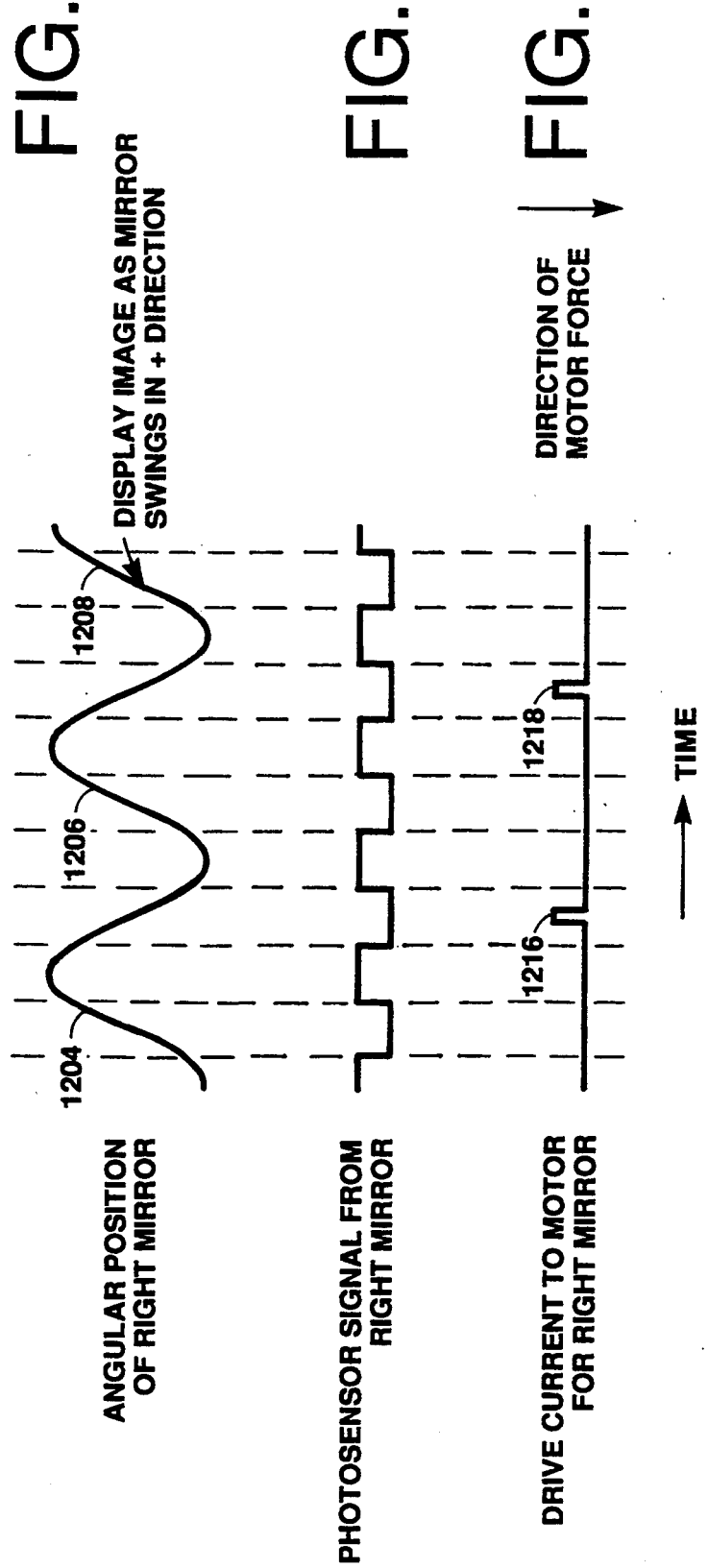
FIG. 12D is a waveform diagram versus time of the angular position of the mirror assembly 1100 in FIG. 11.
FIG. 12E is a waveform diagram versus time of the signal developed by the photocell associated with the mirror assembly 1100 in FIG. 11.
FIG. 12F is a waveform diagram versus time of the drive current supplied to the mirror drive coil in the mirror assembly 1100 in FIG. 11.

The above discussed mechanical design requires that both mirrors move with equal and opposite angular motion. If each mirror assembly were exactly identical to the other assembly, then identical forces could be applied to each assembly to cause the desired motion. The aforementioned U.S. Pat. No. 4,902,083 describes a servo system that will accomplish this goal. FIGS. 12C and 12F show a suitable drive waveform as will be discussed in detail below. However, in actual practice, it is generally not possible to construct two mirror assemblies with normal manufacturing tolerances and insure that they will behave identically. If the resonant frequencies of the two assemblies are different, then the application of equal drive forces to each mirror will not achieve equal amplitudes of motion.

Alternatively, if a separate servo controller of the type described in the aforementioned U.S. Pat. No. 4,902,083 is used for each mirror assembly in an attempt to solve this problem, then another undesirable result occurs. Because of the inherent coupling between the two resonant systems the individual servos will not be able to achieve the desired steady state. This may be manifest as a low frequency "beat" which is most annoying to the user. In order to eliminate such problems it is necessary to drive each mirror assembly with slightly different signals so that the primary force vectors of each assembly will be the same and cancel.

In the illustrative embodiment, a special electronic servo loop is used to drive the mirrors at the desired amplitude with the desired phase relationship to cause primary force vector cancellation. For operation at resonance, the drive force must be 90° out of phase with the mirror position. This drive force can be accomplished by supplying a drive current to the mirror drive coils which current assumes the values of a cosine wave. Alternatively, the proper drive can be created by applying a properly timed pulse train to the mirror drive coil. The relative timing is shown in FIGS. 12A-12F.

FIG. 12A illustrates the angular position of one of the mirror assemblies, such as mirror assembly 1102 in FIG. 11 versus time. The vertical dotted lines represent the time of transition of the photocell between its "high" to "low" states. At resonance, this angular position has a sinusoidal form as mentioned above. The imaging electronics are designed to display the image during the time that the mirror assembly 1102 swings in the positive direction as indicated by the heavy lines 1200 and 1202 in FIG. 12A.

In a similar manner, FIG. 12D illustrates the angular position of mirror assembly 1100 in FIG. 11 versus time. The image is displayed during the time that the mirror assembly 1100 swings in the positive direction as indicated by the heavy lines 1204 and 1206 in FIG. 12D.

FIGS. 12B and 12E represent the electronic signals developed by the photocells associated with each mirror assembly as discussed above. Essentially, the photocell signal is "low" when the mirror assembly is in the center portion of its arc and "high" when the mirror assembly is near the end of its travel. These signals are used in the servo electronics as discussed below.

When the system is perfectly matched, proper motion is achieved when the same drive signal is applied to both mirrors. The pulsed drive signals for each mirror assembly as shown in FIGS. 12C and 12F as pulses 1210-1214 for mirror assembly 1102 and pulses 1216-1218 for mirror assembly 1100. In steady state operation the energy supplied to the system by the drive pulses exactly balances the energy lost due to air friction and other damping losses. Accordingly, increasing the pulse width of the drive pulses will cause an increase in the amplitude of mirror assembly motion. FIG. 12 shows drive pulses applied on the mirror retrace motion. This has been found useful to avoid disturbing the mirror velocity while the image is displayed.

However, where the mirror assemblies are not perfectly matched, the resulting amplitudes of the mirror motion will be different when the same drive signals are applied to both mirror assemblies. For example, in a model of the imaging system shown in FIGS. 1 and 2, it was found that when the natural frequency of one mirror assembly was 50.00 Hz and the natural frequency of the other mirror assembly was 50.50 Hz, the amplitude of the other mirror assembly was only 78.2% of the amplitude of the first mirror assembly when both mirror assemblies were driven with the drive signal illustrated as the narrow pulses shown in FIGS. 12C and 12F.

Figure 13D:
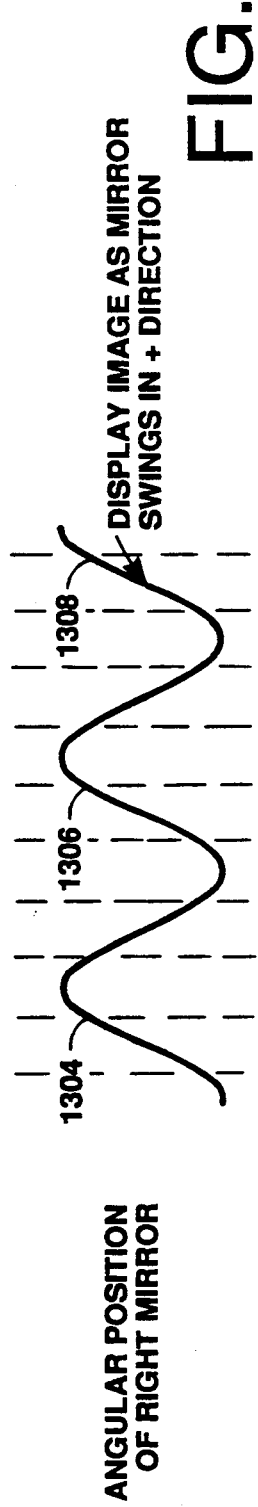
FIG. 13D is a waveform diagram versus time of the angular position of the mirror assembly 1100 in FIG. 11.
Figure 13E:
FIG. 13E is a waveform diagram versus time of the signal developed by the photocell associated with the mirror assembly 1100 in FIG. 11.
Figure 13F:
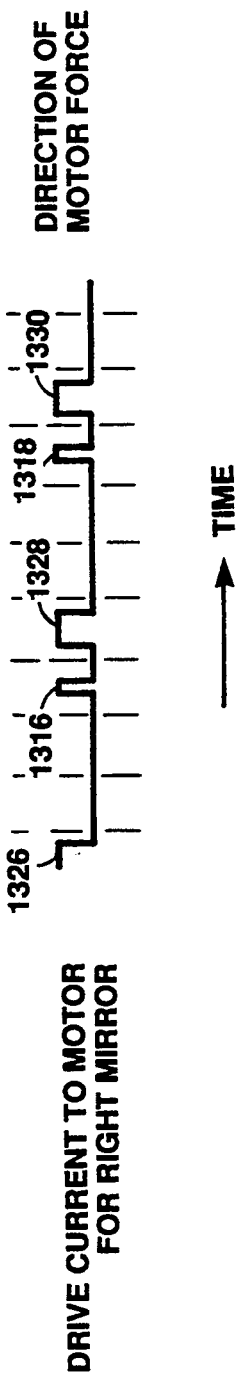
FIG. 13F is a waveform diagram versus time of the drive current supplied to the mirror drive coil in the mirror assembly 1100 in FIG. 11 in order to compensate for unequal mirror assemblies.

It has been found that a drive signal of the form shown in FIGS. 13C and 13F will produce equal mirror motion. In particular, lines 13A and 13D represent the angular position of the two mirror assemblies as shown in FIGS. 12 A and 12D. Lines 13B and 13E are equivalent to lines 12B and 12E. As with FIGS. 12C and 12F, the narrow drive pulses 1310-1318 add energy to the system to make up losses due to air friction and other losses.

The wider pulses, 1320–1330, can be considered to change the effective spring rate of the mirror assemblies, and hence to change the natural frequency of the mirror assemblies to allow self resonant motion at the same frequency. For example, in FIG. 13C, pulses 1320–1324 applied to mirror assembly 1102 are timed to effectively increase the spring force, and thus raise the natural frequency of the mirror assembly. Likewise, the wide pulses 1326–1330 applied to the mirror assembly 1100 are timed to lower the natural frequency of the mirror assembly.

Figure 14:
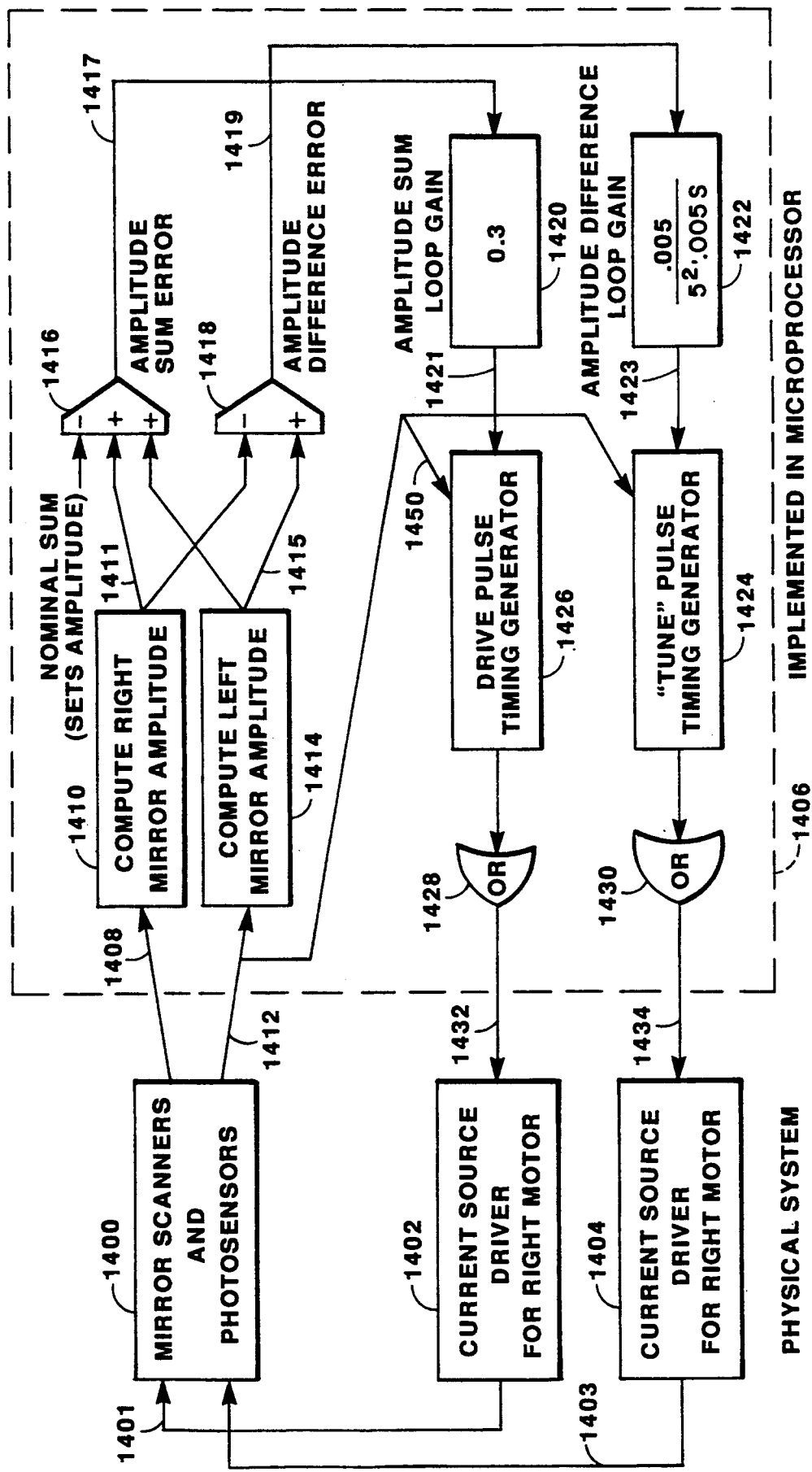
FIG. 14 is an electrical schematic block diagram disclosing an illustrative servo-loop which drives the mirrors to eliminate the beat frequencies between the mirrors.
Figure 15:
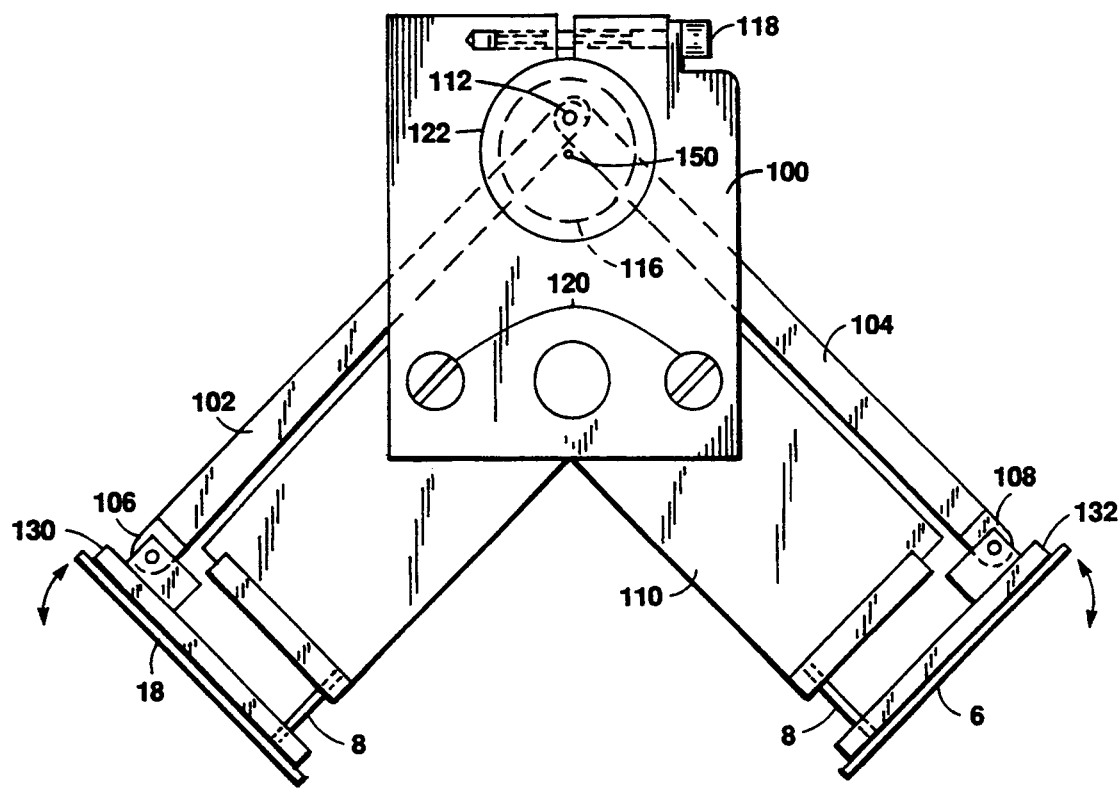
FIG. 15 is a top view of a second embodiment of an illustrative dual mirror mount with an eccentric drive mechanism.
Figure 16:
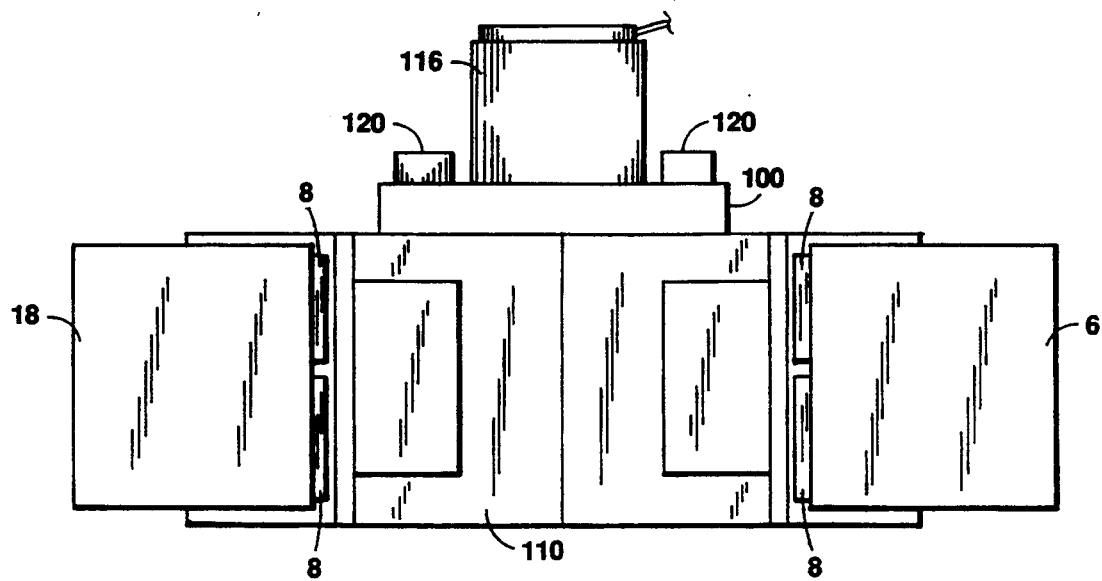
FIG. 16 is a front plan view of the dual mirror mount shown in FIG. 15.
Figure 17:
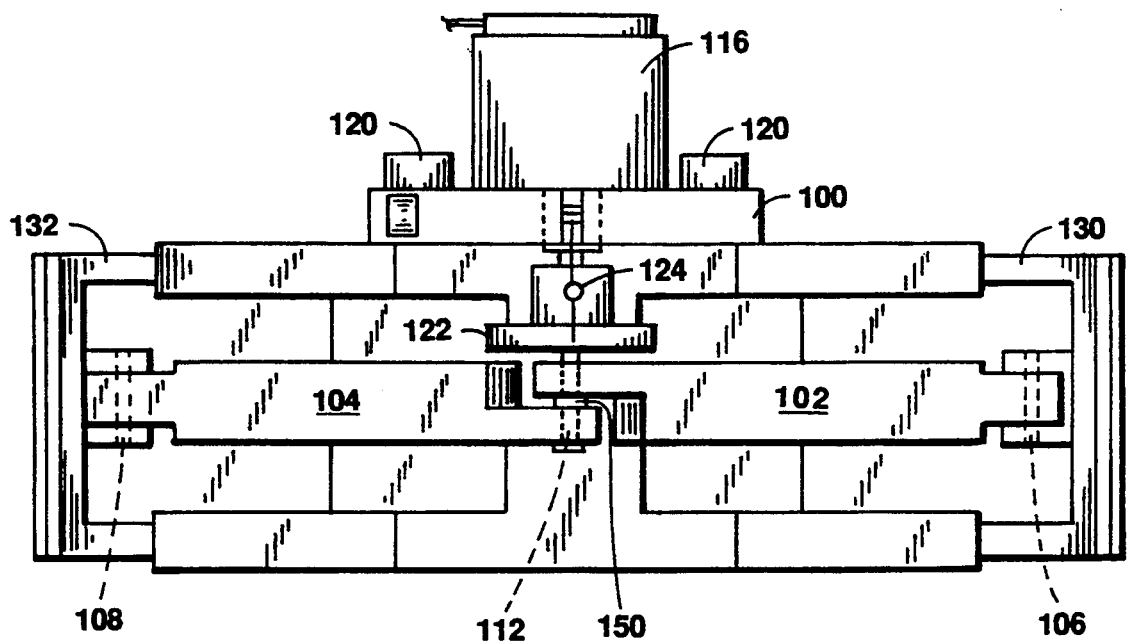
FIG. 17 is a back plan view of the dual mirror mount shown in FIG. 15.
Figure 18:
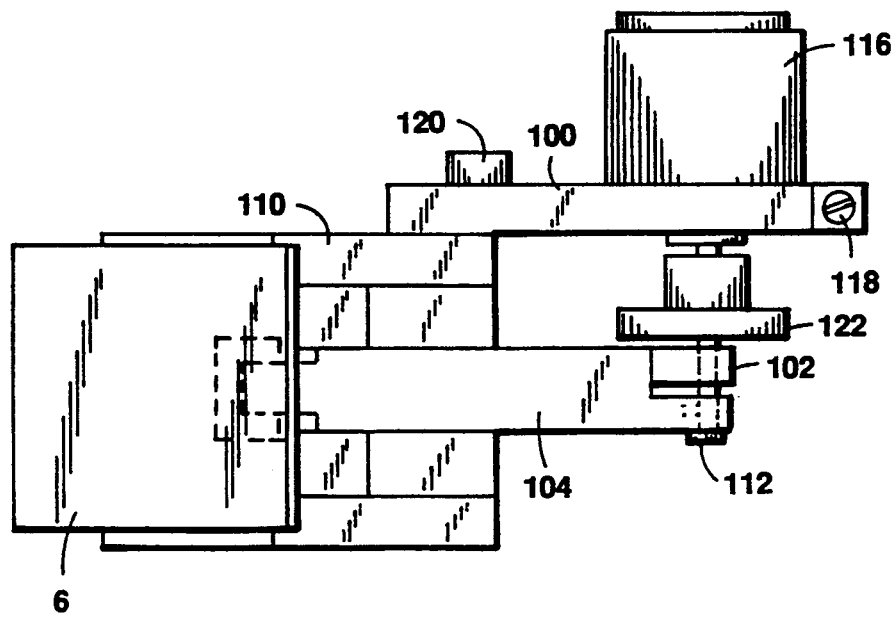
FIG. 18 is a side view of the mirror mount shown in FIG. 15.
Figure 19:
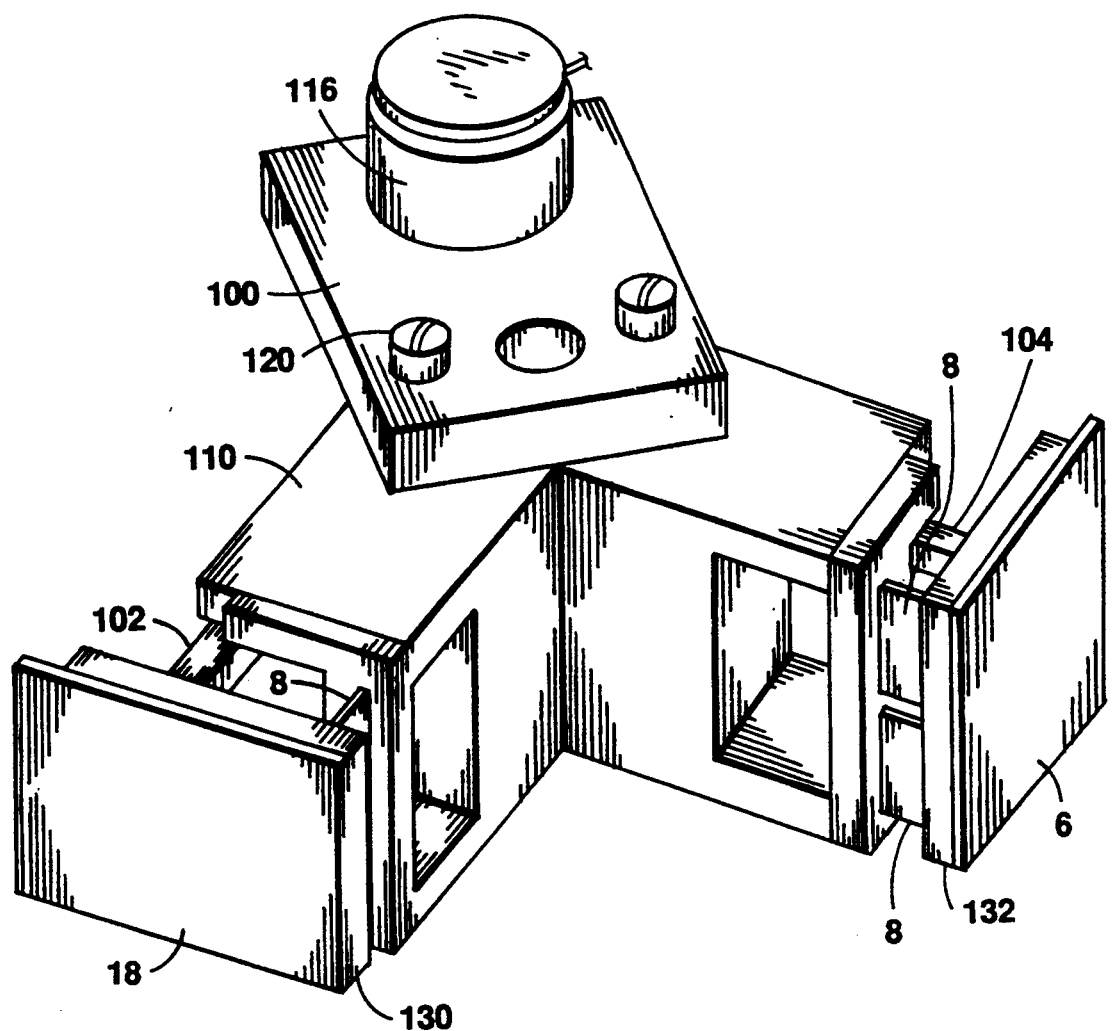
FIG. 19 is front isometric view of the mirror mount shown in FIG. 15.

FIG. 14 shows a block schematic diagram of an electronic control system that has been found satisfactory to keep the mirror assembly amplitudes equal by supplying drives pulses in the form shown in FIGS. 13C and 13F. In FIG. 14, block 1400 represents the physical system consisting of the mirrors, mirror supports, coil supports and voice coil motor drive coils. The two inputs, 1401 and 1403, are drive currents to the motor drive coils. The output 1408 is the logic signal from one mirror position photosensor as shown in FIGS. 12B and 12E. The output 1412 is the logic signal from the other mirror position photosensor as shown in FIGS. 13B and 13E.

As will be explained, the amplitude sum loop, or "drive" loop operates in conventional fashion to cause the sum of the right mirror amplitude 1411 and the left mirror amplitude 1415 to stabilize at, or near, the desired value.

The amplitude difference loop has been found effective to drive the difference between the right and left mirror amplitudes 1415 and 1411 to zero. As has been previously explained, a discrepancy in the steady state amplitudes 1415 and 1411 can be corrected by adding pulses 1320–1330 to the drive pulse train.

The photosensor position signal from one mirror assembly on output 1408 is provided to computation block 1410. This block implements a straightforward algorithm to calculate the mirror oscillation amplitude from the time interval history of the photosensor signal. Although it is possible to compute the exact mirror amplitude from the pulse width using trigonometry, a simple linear approximation is used in the preferred embodiment. In a similar manner, the photosensor position signal from the other mirror assembly on output 1412 is provided to computation block 1414. This latter block is also a conventional calculation block which calculates the mirror oscillation amplitude from the photosensor signal.

The outputs 1411 and 1415 of the calculation blocks 1410 and 1414, respectively, are numerical values representing the most recent estimate of mirror amplitudes for the two mirror assemblies. These outputs are applied to a sum block 1416. Sum block 1416 also determines the difference between the sum of the output values and a nominal reference value which is used to set the overall mirror oscillation amplitude.

The sum and difference outputs 1417 and 1419, respectively, are provided to loop gain blocks 1420 and 1422. Gain block 1420 sets the overall gain of the drive loop. Difference loop gain block 1424, in addition to setting a desired loop gain also introduces a loop transfer function which effectively is a low-pass filter and integrator. The particular values for the loop gains and constants have been found to operate satisfactorily in actual systems, however, other values can be used in accordance with the teachings of the invention.

The outputs 1421 and 1423 of the two gain blocks are provided to the drive and tuning pulse generator blocks, 1426 and 1424. These latter blocks operate conventionally to convert the numerical output of loop gain block 1420 into pulses 1210–1218 with a 90° phase relationship to the mirror position and to convert the numerical output of loop gain block 1424 into pulses 1320–1330 with a 0° or 180° phase relationship to the mirror position. Block 1426 receives a timing reference from the photosensor of only one mirror assembly by means of lead 1450. The output of only one photosensor is used for convenience, since at the nominal operating point both photosensor signals are similar.

The numerical output of the drive pulse block 1426 is a numerical value corresponding to the amount of 90° drive that is desired to cause the mirror amplitudes to approach the desired amplitude. As previously mentioned, drive signals applied to the mirror assemblies at 90° to the angular position adds energy to the system, and will increase the amplitude of motion. The output of the drive pulse generator corresponds to the narrow pulses 1210–1218 in FIGS. 12C and 12F.)

The output of tune pulse block 1424 is a numerical value which represents the required amount of drive with a 0° phase relationship to the mirror amplitude. Negative values of output 1423 will cause pulses with a 180° phase relationship to the mirror position to be generated. Block 1424 also takes its timing reference from the photosensor of the left mirror only. The output of block 1424 corresponds to the wide pulses 1320–1330 in FIGS. 13C and 13F.

The outputs of the drive pulse generator 1426 and the tune pulse generator 1424 are combined by OR circuits 1428 and 1430 to generate the current control signals on leads 1432 and 1434. As shown in FIGS. 12C and 12F, these latter signals are provided to the current source drivers 1402 and 1404.

The current source drivers 1402 and 1404 can be implemented by means of a simple bipolar transistor which is used to convert the logic drive signal from the pulse generator blocks 1426 and 1424 to a current which can be applied to the drive motor coils.

As shown in FIG. 14, with the exception of the current drivers 1402 and 1404, the entire control system can be implemented in a microprocessor 1406. Alternatively, the control system can be implemented with conventional integrated circuits.

An alternative embodiment of the dual mirror assembly is shown in FIGS. 3–9 is illustrated in FIGS. 15–19. This latter embodiment uses a mechanical linkage from a single motor to oscillate both of the scanning mirrors simultaneously. As shown in FIGS. 15–19, mirrors 6 and 18 are each attached to mirror supports 132 and 130, respectively. Mirror supports 132 and 130 are, in turn, mounted on a frame, or base, 110 by means of flat spring hinges 8.

The mirrors 6 and 18 are oscillated by means of linkage arms 102 and 104, which are connected at pivot points 106 and 108 to mirrors 18 and 6, respectively. The other ends of linkage arms 102 and 104 are connected to a single pivot point 112, which is eccentrically located on a flywheel 122. The flywheel 122 is attached at its center to the shaft 150 of a small electric motor 116. Motor 116 is mounted by clamping plate 100 and clamping screw 118 to base 110 by means of screws 120.

As the motor 116 rotates it turns shaft 150 and flywheel 122 also rotates causing the eccentric pivot point 112 to oscillate the connecting arms 102 and 104. This oscillating motion is transmitted to the mirrors by means of pivot points 106 and 108, in turn, oscillating the mirrors. In this embodiment, a set screw 124, which secures flywheel 122 to the motor shaft 150 may also act as a counterbalance weight as described below.

This latter embodiment does not have the same vibration problems of the embodiment shown in FIGS. 3–9 since the mirrors are not independent. In particular, the linkage arms 102 and 104 and the eccentric pivot 112 are arranged so that mirrors 6 and 18 continuously scan through a limited angle with a substantially sinusoidal motion. The motion of each mirror assembly is of equal angular travel and motion is 90° out of phase for the two assemblies. Flywheel 112 is constructed with an unsymmetrical weight distribution, and serves as a rotating counterbalance. In FIGS. 15–19, flywheel 112 has added weight directly opposite pivot pin 112 which is not shown in the figures.

Figure 20:
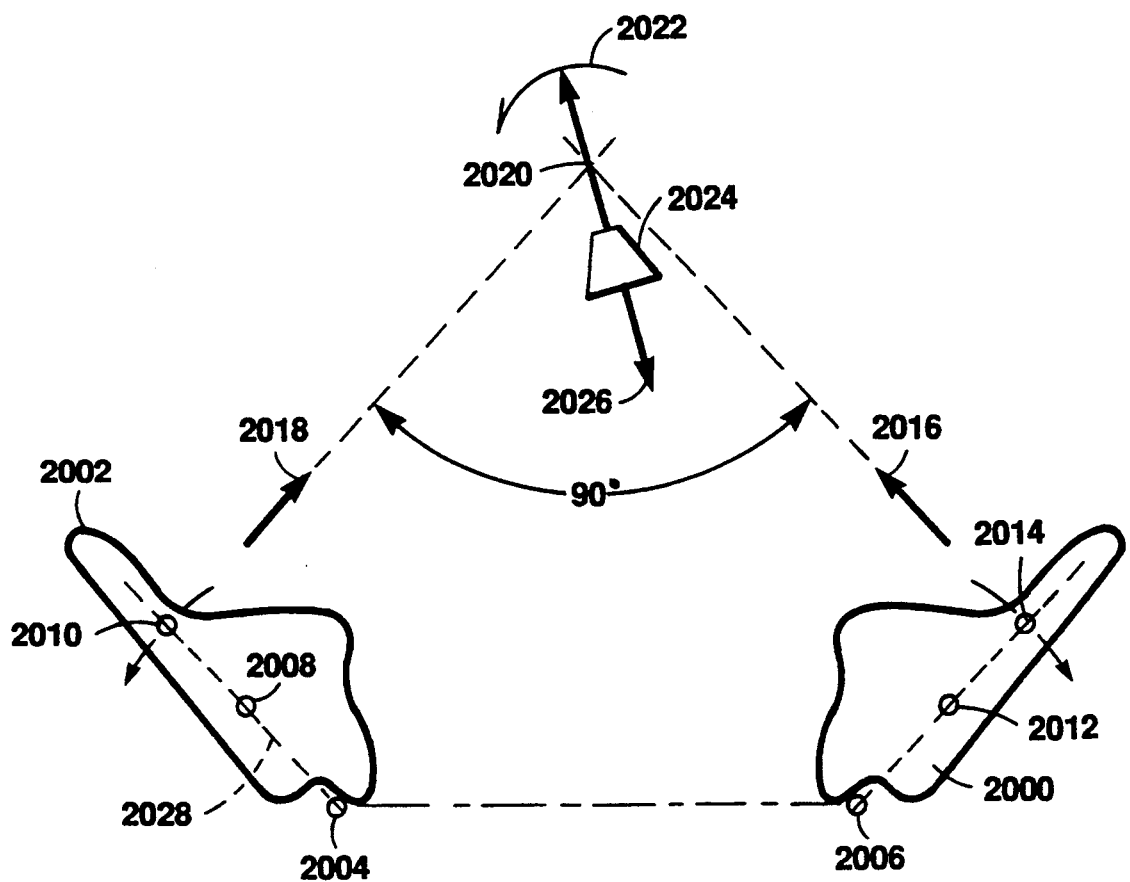
FIG. 20 is a conceptual diagram illustrating the various points involved in a force calculation on each mirror system in the second embodiment shown in FIG. 15.

FIG. 20 is a conceptual diagram which shows the basic components of the system for discussion. As with FIG. 11, irregular shapes 2000 and 2002 represent the mirror assemblies, points 2004 and 2006 represent the mirror assembly pivot points, points 2008 and 2012 represent the center of gravity and points 2010 and 2014 represent the points of percussion.

As discussed previously, the secondary force vectors lie along lines 2028 and 2030 and the primary force vectors are in the direction perpendicular to the secondary force vectors (generally in the direction of arrows 2016 and 2018). The sum of the primary force vectors 2018 and 2016 will be a rotating force vector 2022. Element 2024 is a rotating counterbalance, whose mass is adjusted to create a centrifugal force vector which cancels vector 2022.

The criteria derived from mechanical design theory for generating primary force cancellation is as follows:
a) the primary force vectors for the two mirror assemblies must be *perpendicular;*
b) a rotating counterweight with off-center mass must be located at the intersection point 2020 of the primary force vectors and rotated at the frequency of mirror vibration;
c) the mirror assemblies must be driven so that the primary force vectors have equal magnitude, and are 90° out of phase; and
d) the location of the off-center mass must be adjusted to exactly balance the forces generated by the mirror assemblies.

When the above criteria are met, the sum of the two primary force vectors and the centrifugal force vector 2026 due to rotation of counterweight will cancel.

Another embodiment for the dual mirror mount assembly utilizes two mirror assemblies which move with a 0° phase relationship. This motion can be generated by using two mirrors which are coupled together by parallel linkage arms so that they move as one unit. This embodiment is useful if it is desired to construct a dual image display which uses a single light emitter array and a beam splitter. In general, this embodiment and others like it will also generate vibration problems. These vibration problems can be reduced or eliminated in a manner similar to the previous two embodiments.

More particularly, the vibration is reduced by controlling the mirror motion so that a prescribed phase and amplitude relationship is met (e.g. by linkages or servo drive mechanisms). When this is done the result is a composite force vector that is the vector sum of the primary force vectors from the individual mirror assembly motions.

This vector sum is then counterbalanced by using one or more counterweights located and driven so that reaction force vector from counterweights substantially cancels the composite force vector from mirrors.

Figure 21:
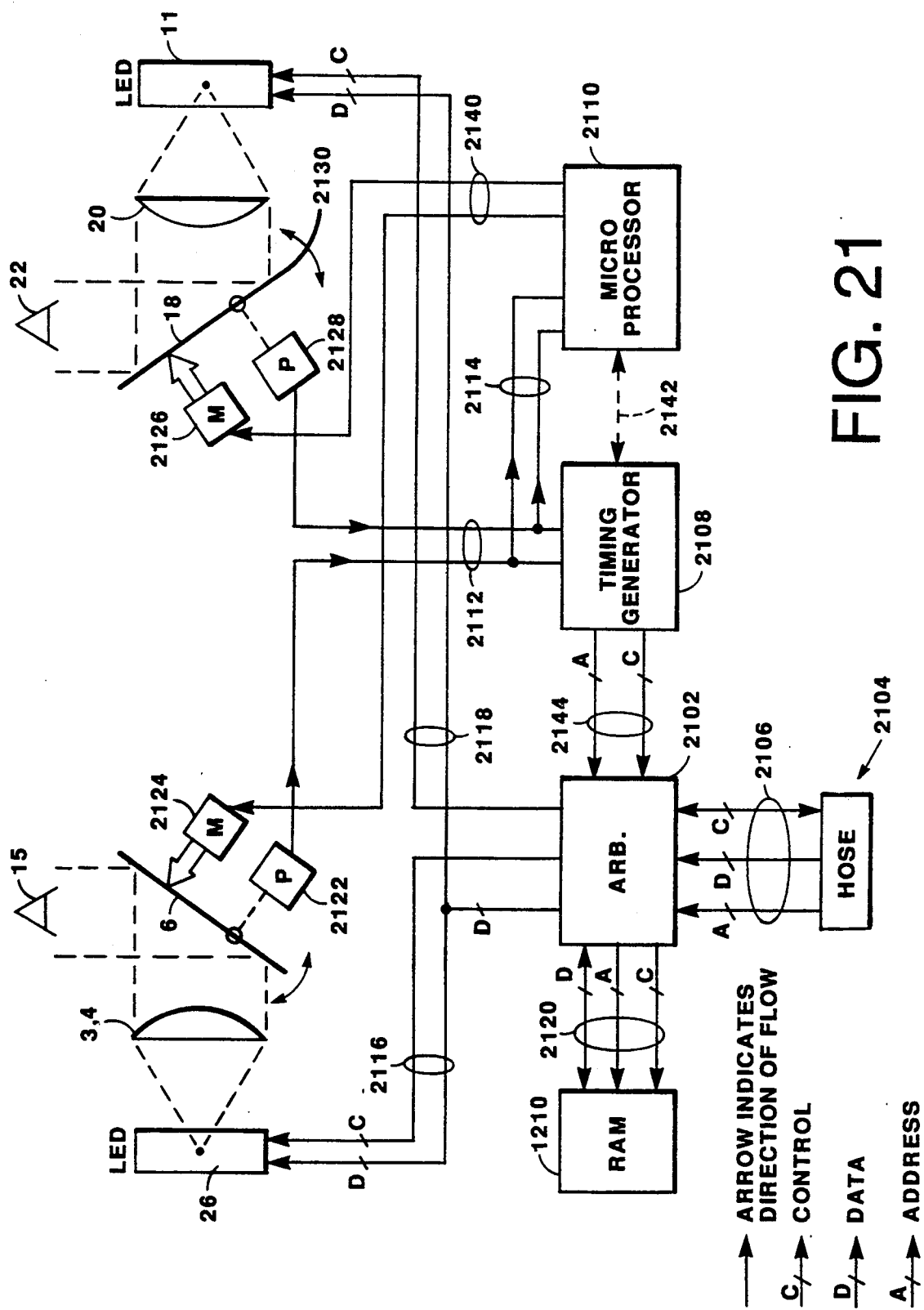
FIG. 21 is an overall block schematic diagram of the inventive dual image display system integrated with a host computer.

FIG. 21 shows an electrical schematic block diagram of the overall system configuration of the inventive dual image display system integrated with a host computer 2104. The center section of FIG. 21 represents two separate image display systems and is symmetrical. The numeric designations corresponding to elements in FIGS. 1 and 2 have similar designations in FIG. 21. The user's eyes are designated as numerals 15 and 22. LED arrays 11 and 26 generate the image information which is magnified by lenses 3,4 and 20. Scanning mirrors 6 and 18 reflect the line image generated by arrays 11 and 26 to the user's eyes 15 and 22.

Blocks 2124 and 2126 represent motors capable of applying forces to mirrors 6 and 18, respectively, when commanded to by microprocessor 2110 via control leads 2140. Blocks 2122 and 2128 represent photosensors, which, as previously described, detect when the associated mirror position exceeds a specified angular position, typically 70.7% of nominal full travel and relay this information to the timing generators 2108 and microprocessor 2110 by means of leads 2112 and 2114.

The primary function of microprocessor 2110 is to generate current pulses to drive the mirror assembly motors as previously described. Microprocessor 2110 also communicates with timing generator 8 as shown by dotted line 2142 to control whether data is sent to the left LED array 26 or the right LED array 11. This control is necessary because photosensors 2122 and 2128 do not inherently indicate the direction of mirror motion.

The timing generator 2108 receives the outputs of photosensors 2122 and 2128 and generates control signals on address and control buses 2144 to clock data from RAM memory 2100 into the LED shift registers associated with LED arrays 11 and 26. Timing generator 2108 must vary the data transfer rate at which new columns of data are sent to the LED shift registers because the mirror angular velocity is fastest at center of mirror scanning arc.

A RAM arbitration circuit 2102 is provided to allow both timing generator 2108 and host computer system 2104 to access RAM 2100 without interference. Arbitration may be accomplished by interleaving host and timing generator access. Alternately, arbitration may be accomplished by denying host access to RAM 2100 when each screen of data is being sent to LED arrays 11 and 26. Arbitration circuit 2102 communicates with RAM 2100 via data, address and control buses 2120 and with host computer system 2104 via address, data and control buses 2106.

Upon initial turn-on of the display system, microprocessor 2110 sends drive pulses to motors 2124 and 2126 until mirrors 6 and 18 achieve correct scanning amplitudes. After initial start-up, microprocessor 2104 monitors the outputs of photosensors 2122 and 2128 and adjusts the motor drive pulse widths to maintain correct oscillation amplitudes in both mirrors 6 and 18, and to also maintain the necessary 180° phase relationship between mirrors 6 and 18.

During the normal operation of the system, host computer 2104 writes data to RAM 2100 through arbitration circuit 2102 in a conventional fashion. In the implementation shown in FIG. 21, host computer 2104 can only write data into RAM 2100, and not read data from RAM 2100. In another alternative implementation, host computer 2104 can both write and read data into RAM 2100 in conventional manner.

For normal operation, in one preferred implementation, a full screen of data is written to the shift registers of the right LED array 11 while the right mirror 18 is scanning *clockwise* (at this time, the left mirror 6 is scanning counter-clockwise). One half cycle of mirror motion later, the left mirror 6 will be scanning clockwise. At this time a full screen of data is then written to the shift registers for the left LED array 26.

Upon a falling edge transition of right photosensor 2128, or the left photosensor 2122, timing generator 2108 causes one column of data to be clocked from RAM 2100 to right LED array 11 or left LED array 26. Subsequent data columns are clocked at a predetermined rate to compensate for non-linear velocity of mirrors 6 and 18. In general, the repetition rate for image refreshment should be at least as fast as the threshold for flicker-detection in the user. 50 Hz has been found to be satisfactory for most individuals.

This latter implementation has the advantage that the screen display electronics, including screen buffer RAM 2100, arbitration circuit 2102, timing generator 2108 and microprocessor 2110 can be shared.

While the preceding discussion shows as separate devices, the screen buffer RAM 2100, arbitration circuit 2102, timing generator 2108 and microprocessor 2110, it should be understood that these units might be combined into one or more devices. Furthermore, while the servo algorithm is shown implemented in digital form in microprocessor 7, it should be understood that a conventional analog servo loop might be employed.

It should be understood that the foregoing description is intended to illustrate rather than limit the invention. Modifications and additions to the disclosed embodiments will be recognized by those skilled in the art which do not depart from the scope of the invention, as defined by the claims. For example, although the disclosed embodiments are configured for use with an "eyeglasses" type device, the inventive display device could also be helmet-mounted or hand-held. In addition, instead of the single row of LED devices disclosed, other light-emitting devices could be used such as multiple rows of different color LEDs for the generation of color images. Also, light emitting devices such as backlit PLZT shutters could be used.

What is claimed is:

1. A dual image display comprising:
    a housing;
    a light-emitting mechanism generating first and second images;
    first and second oscillating scanning mirrors respectively positioned to reflect the first and second images to a user's eyes, said first and second oscillating scanning mirrors being supported by the housing and each of said first and second oscillating scanning mirrors independently generating vibrations that are transmitted to the housing and interact; and
    means responsive to the physical position of both of the first and second oscillating scanning mirrors for controlling the motion of the first oscillating scanning mirror and independently controlling the motion of the second oscillating scanning in order to reduce the vibrations transmitted to said housing due to the motions of said first and second oscillating scanning mirrors and the interaction therebetween.

2. A dual image display as claimed in claim 1 wherein the controlling means comprises:
    a first position detector responsive to the physical position of the first oscillating scanning mirror for generating a first position signal;
    a second position detector responsive to the physical position of the second oscillating scanning mirror for generating a second position signal; and
    a drive signal generator responsive to the first and the second position signals for generating at least one drive signal having an amplitude and phase which is related to the first and second position signals.

3. A dual image display as claimed in claim 2 wherein the controlling means comprises:
    a first drive motor responsive to the at least one drive signal for moving the first oscillating scanning mirror.

4. A dual image display as claimed in claim 3 wherein the drive signal generator is responsive to the first and the second position signals for generating a second drive signal having an amplitude and phase which is related to the first and the second position signals and the controlling means comprises:
    a second drive motor responsive to the second drive signals for moving the second oscillating scanning mirror.

5. A dual image display comprising:
    a housing;
    a light-emitting mechanism generating first and second images, said light-emitting mechanism being supported by the housing;
    a first scanning mirror assembly movably mounted on the housing and positioned to reflect the first image to a first eye of a user;
    a second scanning mirror assembly movably mounted on the housing and positioned to reflect the second image to a second eye of the user; p1 a first motor responsive to a first drive signal for oscillating the first scanning mirror assembly in relation to the housing causing the first scanning mirror assembly to transmit first vibrations to the housing;
    a second motor responsive to a second drive signal for oscillating the second scanning mirror assembly in relation to the housing causing the second scanning mirror assembly to transmit second vibrations to the housing, which second vibrations combine with the first vibrations to generate third vibrations; and
    control means responsive to oscillations of the first and second scanning mirror assemblies for generating the first and second drive signals to coordinates oscillation of the first and second scanning mirror assemblies so that vibrations transmitted to the housing due to coupling of the oscillating first and second scanning mirror assemblies are reduced.

6. A dual image display as claimed in claim 5 wherein the first and second scanning mirror assemblies each generate a primary force vector on the housing when they oscillate, and
    wherein the first and second scanning mirror assemblies are constructed and arranged so that the primary force vector generated on the housing by the first scanning mirror assembly is collinear to the primary force vector generated on the housing by the second scanning mirror assembly.

7. A dual image display as claimed in claim 6 wherein the control means generates the first and second drive signals to move the first and second scanning mirror assemblies in substantially opposing directions.

8. A dual image display as claimed in claim 7 wherein said first and second scanning mirror assemblies are constructed and arranged so as to generate substantially equal and opposite forces on the housing when the first and second scanning mirror assemblies are moved in opposing directions.

9. A dual image display as claimed in claim 5 wherein the first and second scanning mirror assemblies each have a center of mass, are respectively mounted on the housing at first and second pivot points, and are arranged so that a line passing between the centers of mass of the first and second scanning mirror assemblies is perpendicular to a line passing between the first and second pivot points.

10. A dual image display as claimed in claim 9 wherein the control means generates the first and second drive signals to move the first and second scanning mirror assemblies in substantially opposing directions.

11. A dual image display as claimed in claim 10 wherein the first and second scanning mirror assemblies each have a geometry, a mass and a rotary inertia, and wherein:
   the first and second scanning mirror assemblies have substantially equal masses and substantially equal rotary inertias; and
   the geometry of the first scanning mirror assembly is substantially a mirror image of the geometry of the second scanning mirror assembly about a plane passing midway between the first scanning mirror assembly and the second scanning mirror assembly.

12. A dual image display as claimed in claim 5 wherein the first and second scanning mirror assemblies each have a center of mass and are respectively mounted on the housing at first and second pivot points, and wherein the first pivot point coincides with the center of mass of the first scanning mirror assembly and the second pivot point coincides with the center of mass of the second scanning mirror assembly.

13. A method for controlling the movement of a pair of scanning mirrors in a dual image display having a housing and a light-emitting mechanism that generates first and second images, each of the pair of scanning mirrors being movably mounted on the housing, each oscillating at a natural frequency and each being positioned to reflect one of the first and second images to a user's eye, the method comprising the steps of:
   A. determining a first scanning mirror of the pair of scanning mirrors which has a lower natural oscillation frequency than a second scanning mirror of the pair of scanning mirrors; and
   B. increasing the oscillation frequency of the first scanning mirror determined in step A until the natural oscillation frequencies of the first and second scanning mirrors are substantially equal.

14. A method for controlling the movement of first and second oscillating scanning mirrors as claimed in claim 13 further including the step of:
   C. decreasing the oscillation frequency of the second scanning mirror determined in step A until the natural oscillation frequencies of the first and second scanning mirrors are substantially equal.

15. A control circuit for use in a dual image display having a housing, a light-emitting mechanism that generates first and second images, first and second scanning mirrors each being mounted to the housing for movement relative thereto and each being positioned to reflect one of the first and second images to a user's eye, a first motor responsive to a first control signal for oscillating the first scanning mirror with a first amplitude, a second motor responsive to a second control signal for oscillating the second scanning mirror with a second amplitude, the control circuit comprising:
   a first sensor responsive to the physical position of the first scanning mirror for generating a first position signal;
   a second sensor responsive to the physical position of the second scanning mirror for generating a second position signal;
   first control signal generation means for generating the first control signal for driving the first motor;
   second control signal generation means for generating the second control signal for driving the second motor; and
   means, responsive to the first and second position signals, for controlling the first and second control signal generation means to cause the first and second oscillation amplitudes to be substantially equal.

16. A control circuit as claimed in claim 15 wherein: the controlling means comprises;
   a first amplitude computation means responsive to the first position signal for generating a first amplitude signal related to the first oscillation amplitude;
   a second amplitude computation means responsive to the second position signal for generating a second amplitude signal related to the second oscillation amplitude;
   a summer responsive to the first and second amplitude signals for generating a sum signal indicating the sum of the first and second amplitude signals;
   a nominal comparator for generating a first difference signal indicating a difference between the sum signal and a reference value that indicates a desired amplitude sum;
   an amplitude comparator for generating a second difference signal indicating a difference between the first and second amplitude signals;
   drive pulse generation means, responsive to the first difference signal and the first position signal, for generating first and second drive pulse;
   tune pulse generation means, responsive to the second difference signal and the first position signal, for generating first and second tuning pulses;
   means for applying the first drive pulse to the first control signal generation means and the second drive pulse to the second control signal generation means to cause the sum of the oscillation amplitudes of the first and second scanning mirrors to approach the desired amplitude sum; and
   means for applying the first tuning pulse to the first control signal generation means and the second tuning pulse to the second control signal generation means to cause the oscillation amplitudes of the first and second scanning mirrors to be substantially equal.

17. A control circuit as claimed in claim 16 wherein: the first control signal generation means generates the first control signal by performing a logical OR of the first drive pulse and the first tuning pulse; and the second control signal generation means generates the second control signal by performing a logical OR of the second drive pulse and the second tuning pulse.

18. A control circuit as claimed in claim 16 wherein the tune pulse generation means includes:
   means for timing the generation of the first tuning pulse to decrease the first oscillation amplitude when the first oscillation amplitude is greater than the first oscillation amplitude;
   means for timing the generation of the first tuning pulse to increase the first oscillation amplitude when the second oscillation amplitude is greater than the first oscillation amplitude;
   means for timing the generation of the second tuning pulse to increase the second oscillation amplitude when the first oscillation amplitude is greater than the second oscillation amplitude; and
   means for timing the generation of the second tuning pulse to decrease the second oscillation amplitude when the second oscillation amplitude is greater than the first oscillation amplitude.

19. A head-mounted dual image display device comprising:
   a housing;
   first and second light-emitting device arrays mounted on said housing, each array having a plurality of light-emitting devices, the first and second light-emitting device arrays respectively generating first and second image lines;
   a first scanning mirror assembly mounted on the housing for movement relative thereto and positioned to reflect the first image line to a first eye of a user;
   a second scanning mirror assembly mounted on the housing for movement relative thereto and positioned to reflect the second image line to a second eye of the user;
   a first motor driving the first scanning mirror assembly for movement relative to the housing so that the first scanning mirror assembly oscillates in relation to the housing, the first motor responsive to a first drive signal, the first scanning mirror assembly transmitting vibrations to the housing as it oscillates;
   a second motor driving the second scanning mirror assembly for movement relative to the housing so that the second scanning mirror assembly oscillates in relation to the housing, the second motor responsive to a second drive signal, the second scanning mirror assembly transmitting vibrations to the housing as it oscillates; and
   control means for generating the first and second drive signals to mechanically oscillate the first and second scanning mirror assemblies to respectively generate first and second raster-scan images from the first and second image lines, the control means further generating the first and second drive signals to coordinate oscillation of the first and second scanning mirror assemblies so that vibrations transmitted to the housing due to coupling of the oscillating first and second scanning mirror assemblies are reduced.

20. A head-mounted dual image display as recited in claim 19 wherein said first and second scanning mirror assemblies are constructed and arranged so as to generate substantially equal and opposite forces on the housing when they are moved in opposing directions.

21. A head-mounted dual image display as claimed in claim 19 wherein the first and second scanning mirror assemblies each generate a primary force vector on the housing when they oscillate, and
   wherein the first and second scanning mirror assemblies are constructed and arranged so that the primary force vector generated on the housing by the first scanning mirror assembly is collinear to the primary force vector generated on the housing by the second scanning mirror assembly.

22. A head-mounted dual image display as claimed in claim 21 wherein the control means generates the first and second drive signals to move the first and second scanning mirror assemblies in substantially opposing directions as they oscillate.

23. A head-mounted dual image display as claimed in claim 19 wherein the first and second scanning mirror assemblies each have a center of mass and are respectively mounted on the housing at first and second pivot points, and wherein the first and second housing assemblies are constructed and arranged so that a line passing between the centers of mass of the first and second scanning mirror assemblies is perpendicular to a line passing between the first and second pivot points.

24. A head-mounted dual image display as claimed in claim 23 wherein the control means generates the first and second drive signals to move the first and second scanning mirror assemblies in substantially opposing directions as they oscillate.

25. A head-mounted dual image display as claimed in claim 19 wherein the first and second scanning mirror assemblies each have a center of mass and are respectively mounted on the housing at first and second pivot points, and wherein the first pivot point coincides with the center of mass of the first scanning mirror assembly and the second pivot point coincides with the center of mass of the second scanning mirror assembly.

* * * * *